(12) United States Patent
Yamashita

(10) Patent No.: US 6,868,113 B2
(45) Date of Patent: Mar. 15, 2005

(54) RECEIVER FOR SPECTRUM SPREADING COMMUNICATION SYSTEM

(75) Inventor: Noboru Yamashita, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 603 days.

(21) Appl. No.: 09/803,049

(22) Filed: Mar. 12, 2001

(65) Prior Publication Data

US 2001/0022809 A1 Sep. 20, 2001

(30) Foreign Application Priority Data

Mar. 14, 2000 (JP) ........................................ 2000-069629
Feb. 8, 2001 (JP) ........................................ 2001-031684

(51) Int. Cl.[7] ................................................ H04B 1/69
(52) U.S. Cl. ...................... 375/147; 375/149; 375/145; 375/367; 375/141; 370/335; 370/342
(58) Field of Search ................................. 375/147, 149, 375/145, 367, 141; 370/335, 342

(56) References Cited

U.S. PATENT DOCUMENTS

| | | | | |
|---|---|---|---|---|
| 5,590,160 A | * | 12/1996 | Ostman | 375/367 |
| 5,689,525 A | * | 11/1997 | Takeishi et al. | 375/141 |
| 5,867,525 A | * | 2/1999 | Giallorenzi et al. | 375/145 |
| 5,910,948 A | * | 6/1999 | Shou et al. | 370/335 |
| 5,940,433 A | * | 8/1999 | Sawahashi et al. | 375/149 |
| 5,982,763 A | * | 11/1999 | Sato | 370/342 |
| 6,163,567 A | * | 12/2000 | Hatch | 375/149 |
| 6,212,222 B1 | * | 4/2001 | Okubo et al. | 375/149 |
| 6,222,834 B1 | * | 4/2001 | Kondo | 370/342 |
| 6,377,614 B1 | * | 4/2002 | Yamashita | 375/149 |

* cited by examiner

Primary Examiner—Stephen Chin
Assistant Examiner—Sudhanshu C. Pathak
(74) Attorney, Agent, or Firm—Rabin & Berdo, P.C.

(57) ABSTRACT

A receiver for a spread spectrum communication system includes an acquiring circuit that periodically acquires a plurality of signals received via a plurality of paths from a transmitter. The receiver also includes a plurality of tracking circuits that track the synchronization of a predetermined number of signals among the plurality of signals acquired by the acquiring circuit. The receiver additionally includes a judging circuit that judges whether present and past propagation conditions of the predetermined signals tracked by the plurality of tracking circuits are good or bad. A selecting circuit is included in the receiver to select the predetermined number of signals from the plurality of signals acquired by the acquiring circuit, based upon the present and past propagation conditions of the signals judged by the judging circuit, to allow the plurality of tracking circuits to track the predetermined number of signals selected by the selecting circuit.

20 Claims, 18 Drawing Sheets

Fig.4
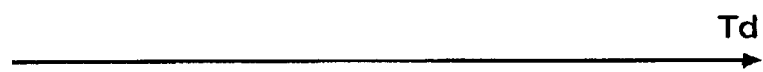
(2a)
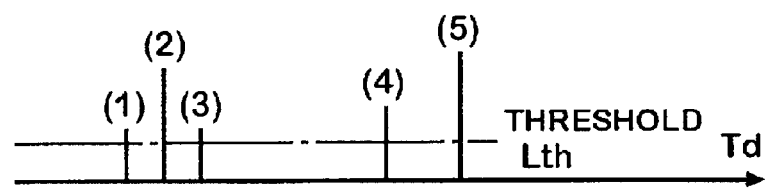
(2b)
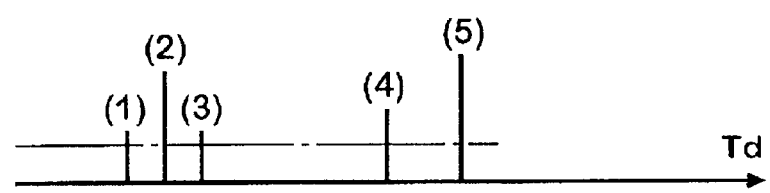
(2c)
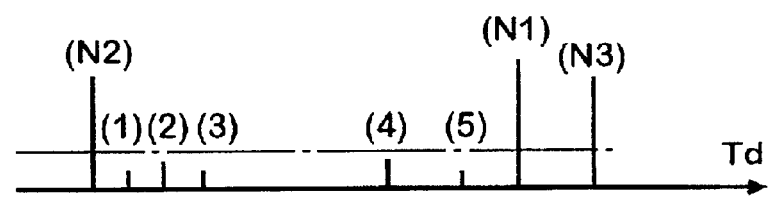
(2d)
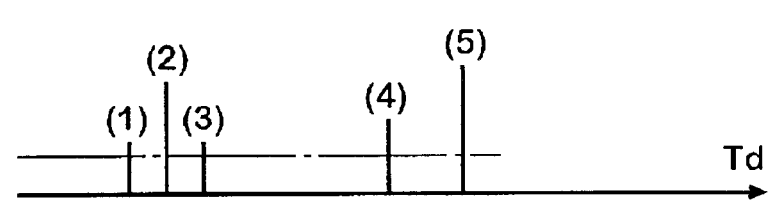
(2e)

Fig.6
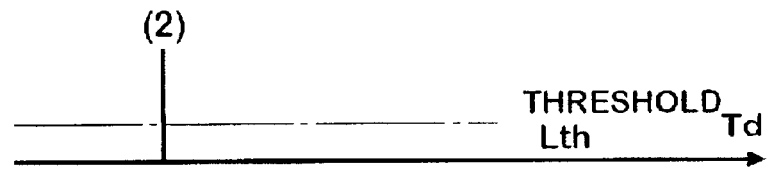
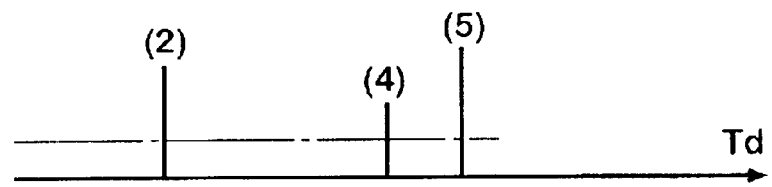
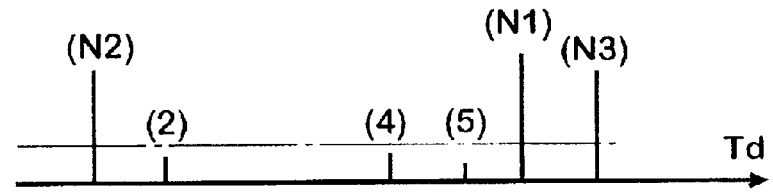
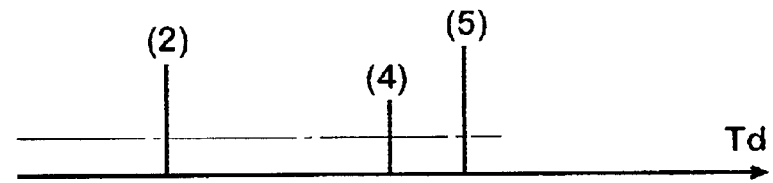

Fig.7
(5a) 
(5b) 
(5c) 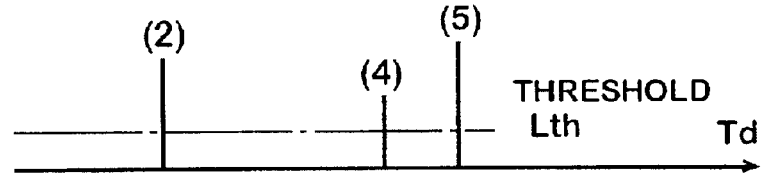
(5d) 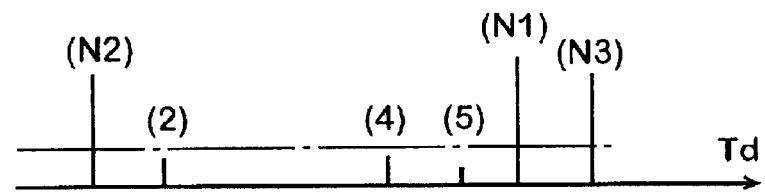
(5e) 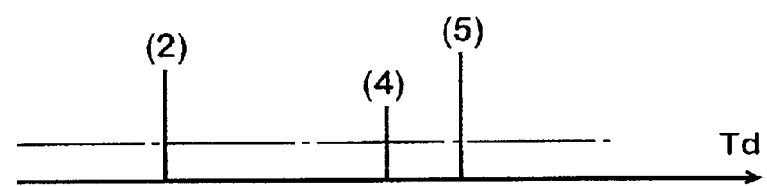

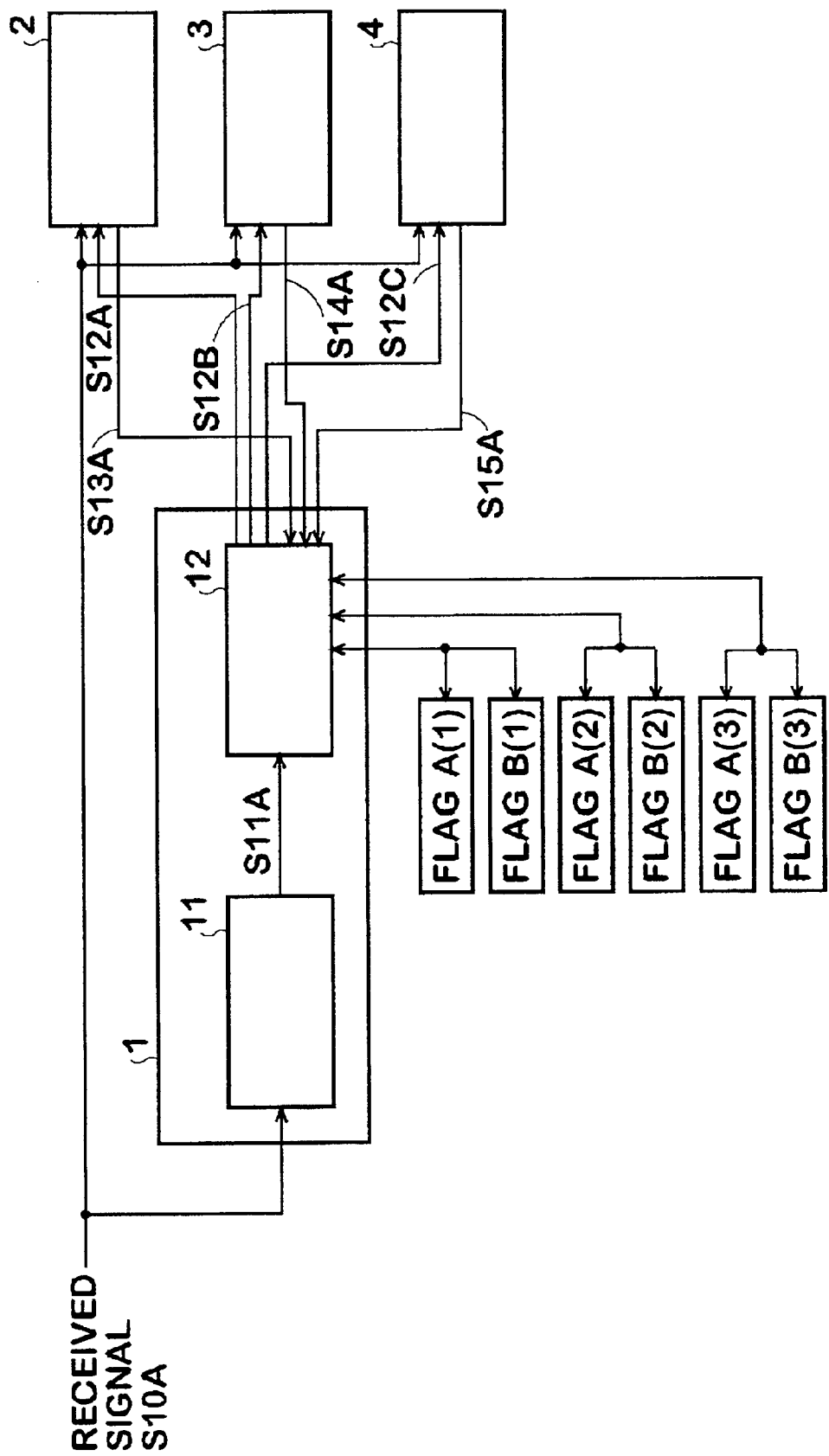

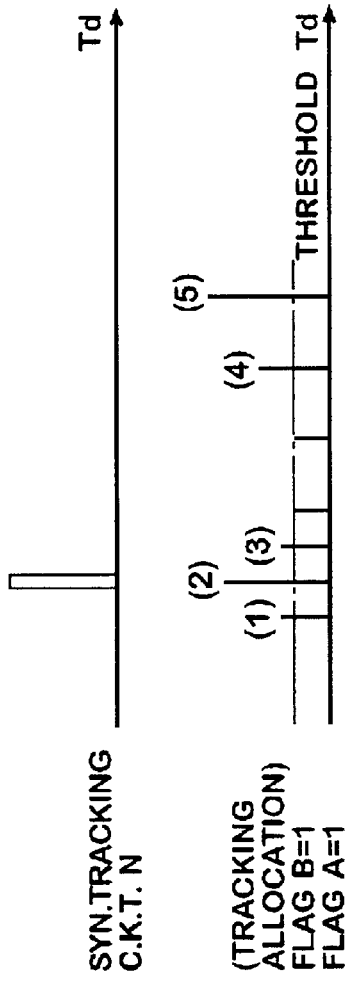
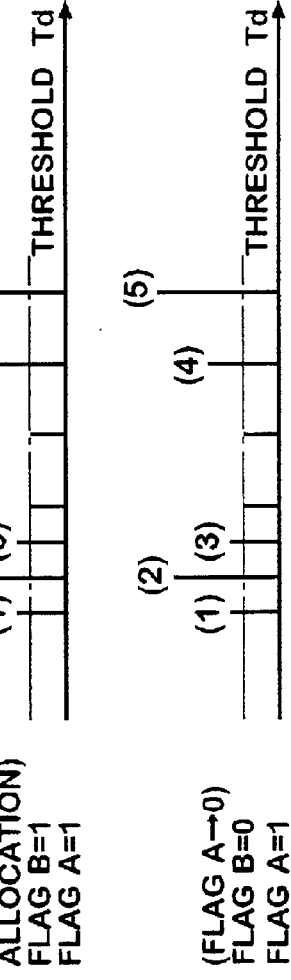
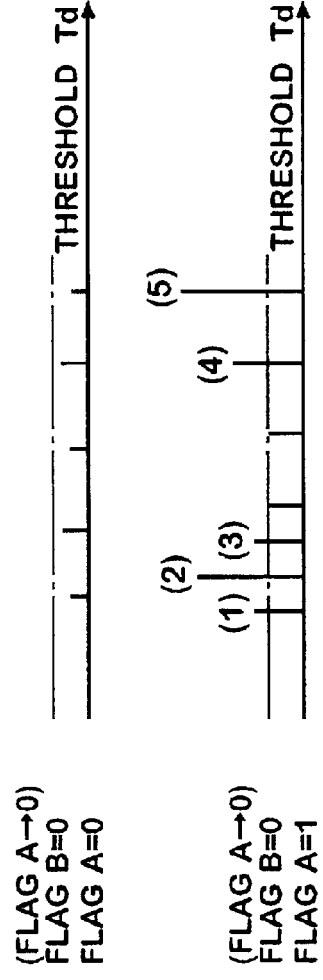
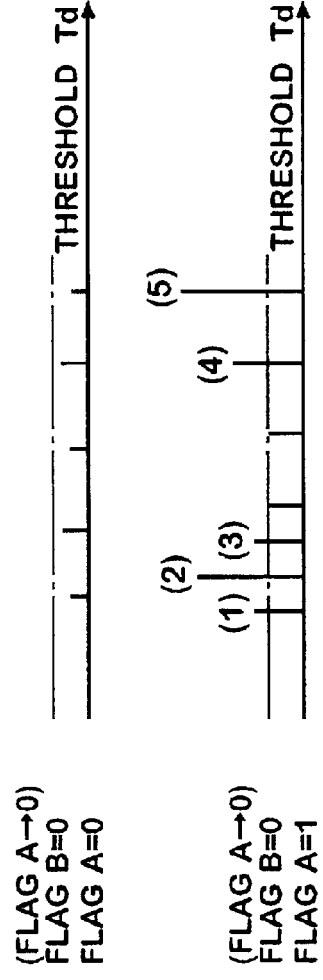
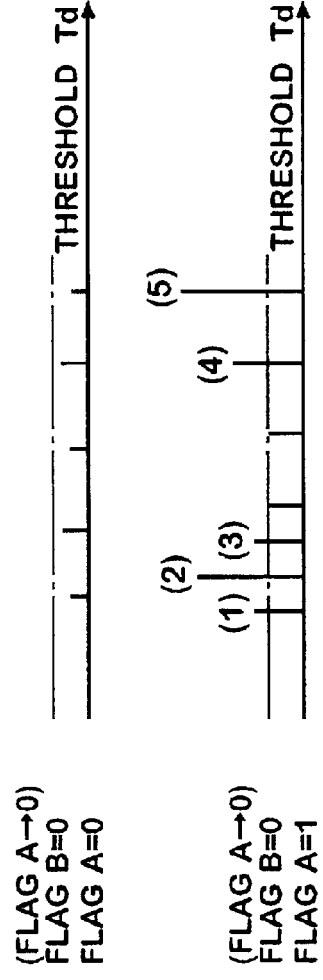

RECEIVER FOR SPECTRUM SPREADING COMMUNICATION SYSTEM

BACKGROUND OF THE INVENTION

1. Technical Field of the Invention

The present invention relates to a spread spectrum communication system suited for a mobile communication system such as a cellular phone system, and in particular to a spread spectrum communication system of the direct sequence type that spreads and despreads a signal to be transmitted, using a spread code such as a pseudo noise sequence (PN sequence.)

2. Related Art

In a spread spectrum mobile communication system of the direct sequence type, a receiver receives a plurality of signals from a transmitter via a plurality of different paths existing between the receiver and the transmitter. The receiver also acquires and tracks several better signals among the received signals, thus combining the tracked signals to demodulate the combined signal.

However, during an intermittent transmission in which the transmission power of each of the plurality of signals is reduced to save power consumption, there may be a plurality of noises larger than the desired signals, so the receiver may acquire and track the noises instead of the desired signals. Consequently, after resuming the transmission after a pause in the intermittent transmission, the receiver cannot demodulate the desired signals until the receiver newly acquires and tracks the desired signals instead of the noises.

SUMMARY OF THE INVENTION

It is therefore a principal object of the present invention to avoid the disadvantages of the prior art.

According to one aspect of the present invention, there is provided a receiver for a spread spectrum communication system comprising an acquiring circuit that simultaneously and periodically acquires in synchronization a plurality of signals received via a plurality of paths different in route from a transmitter; a plurality of tracking circuits that track in synchronization a predetermined number of signals among the plurality of signals acquired by the acquiring circuit, respectively; a judging circuit that judges whether present propagation condition and past propagation condition of the predetermined signals tracked by the plurality of tracking circuits are good or bad; a selecting circuit that selects the predetermined number of signals from the plurality of signals acquired by the acquiring circuit, based upon the present propagation condition and the past propagation condition of the signal judged by the judging circuit, to allow the plurality of tracking circuits to track the predetermined number of signals selected by the selecting circuit.

It is desirable that when a signal tracked by a tracking circuit at the previous cycle coincides with a signal acquired by the acquiring circuit at the present cycle, the judging circuit judges that the present propagation condition of the signal tracked by the tracking circuit is good.

It is desirable that when a signal tracked by a tracking circuit at the present cycle was acquired by the acquiring circuit a plurality of times at cycles prior to the present cycles, the judging circuit judges that the past propagation condition of the signal tracked by the tracking circuit was good.

It is desirable that when the predetermined number of signals tracked by the plurality of tracking circuits at the previous cycle each do not coincide with any of the plurality of signals acquired by the acquiring circuit at the present cycle, the selecting circuit allows at least one of the plurality of tracking circuits to continue tracking at the present cycle one of the predetermined number of signals that the one of the plurality of tracking circuits tracked at the previous cycle, based upon the past propagation condition of the predetermined number of signals. It is further desirable that the selecting circuit allows one of the plurality of tracking circuits that tracked at the previous cycle one of the predetermined number of signals that was the best among predetermined number of signals, to continue tracking at the present cycle the one of the predetermined number signals. It is also further desirable that when the past propagation condition of the predetermined number of signals were similar to each other at the previous cycle, the selecting circuit allows one of the plurality of tracking circuit to continue tracking at the present cycle one of the predetermined number of signals based upon power value of predetermined number of signals.

According to another aspect of the present invention, there is provided a receiver for a spread spectrum communication system comprising: an acquiring unit that simultaneously and periodically acquires a plurality of signals received via a plurality of different paths from a transmitter; and a plurality of tracking units that track the plurality of signals acquired by the acquiring unit, respectively, wherein the acquiring unit allows one tracking unit to continue acquiring the signal that the tracking unit is tracking, and allows the other tracking units to commence tracking the signals that the acquiring unit newly acquires, upon judging there is no signal common to all the signals that the tracking units are tracking and all the signals that the acquiring unit newly acquires.

In the receiver for the spread spectrum communication system according to the present invention, the acquiring unit acquires a plurality of signals received from the transmitter via a plurality of different paths formed between the transmitter and the receiver, and the plurality of tracking units track the plurality of signals acquired by the acquiring unit, wherein the acquiring unit allows one tracking unit to continue tracking the tracked signal when judging all the signals that the plurality of tracking units are tracking differ from all the signals that the acquiring unit newly acquires, and allows the other tracking units to commence tracking the signals that the acquiring unit newly acquires.

In accordance with the receiver for the spread spectrum communication system of the present invention, even though all the signals that the tracking units are tracking temporarily stop, all the tracking units do not commence tracking the signals that the acquiring unit newly acquires, but one tracking unit continues tracking the tracked signal while the other tracking units commence tracking the signals that the acquiring unit newly acquires. Therefore, even though the signals that the acquiring unit newly acquires are noises, the above tracking unit can demodulate based upon the tracked signal. This enables preventing such a conventional problem that the receiver cannot demodulate until the receiver completes acquiring and tracking the true signals.

It is desirable that the tracking units each include a first flag and a second flag, the first flag being used to indicate the probability that the signal that the tracking signal is not a noise is large when the signal that the tracking unit is tracking coincides with a signal that the acquiring unit newly acquires, and the second flag being used to indicate that the signal that the tracking unit is tracking is not a signal that the acquiring unit newly acquires when the signal that the tracking unit is tracking is not a signal that the acquiring unit newly acquires, and when all the first flags each indicate that the probability is low, the acquiring unit allows the tracking unit corresponding to the second flag that indicates the signal that the tracking unit is tracking is not a signal that the acquiring unit newly acquires, to continue tracking the signal that the tracking unit is tracking.

It is further desirable that when a first plurality of second flags among the plurality of second flags indicate the signals that the tracking unit are tracking are not signals that the acquiring unit newly acquires, the acquiring unit allows the tracking unit corresponding to one of the first plurality of second flags to continue tracking the signal that the tracking unit is tracking. It is further desirable that the acquiring unit judges the allowance of the tracking continuation based upon the powers of the signals that the tracking units are tracking.

It is desirable that when all the second flags each indicate the signal that the tracking unit is tracking is a signal that the acquiring unit newly acquires, the acquiring unit allows one tracking unit to continue tracking the signal that the tracking unit is tracking. It is further desirable that the acquiring unit judges the allowance of the tracking continuation based upon the powers of the signals that the tracking units are tracking.

According to another aspect of the present invention, there is provided a synchronization acquiring apparatus comprising: a plurality of synchronization tracking circuits; first flags each provided for one of said synchronization tracking circuits, each of the first flags being brought into a flag-off condition upon initiation of a synchronization acquiring operation and into a flag-on condition when a synchronizing position of a reception response agrees with a synchronizing position being tracked by a corresponding one of said synchronizing tracking circuits; and second flags each provided for one of said synchronization tracking circuits, each of the second flags being brought into the flag-on condition when a synchronizing position is allocated to a corresponding one of said synchronization tracking circuits and into the flag off condition when the synchronizing position of the reception response agrees with the synchronizing position being tracked by a corresponding one of said synchronizing tracking circuits during a subsequent synchronization acquiring operation, each of the second flags being kept in the flag-off condition until the synchronizing position is allocated to a corresponding one of said synchronization tracking circuits.

It is desirable that the synchronization acquiring apparatus further comprises first allocation inhibit synchronization tracking circuit selecting means for selecting one of said synchronization tracking circuits specified by the second flags that are in the flag-off condition when the first flags are all in the flag-off condition and defining the selected synchronization tracking circuit as an allocation inhibit synchronization tracking circuit to have the selected synchronization tracking circuit continue to track synchronization.

It is desirable that the synchronization acquiring apparatus further comprises second allocation inhibit synchronization tracking circuit selecting means for selecting one of said synchronization tracking circuits specified by the second flags that are in the flag-on condition when the first flags are all in the flag-off condition and defining the selected synchronization tracking circuit as an allocation inhibit synchronization tracking circuit to have the selected synchronization tracking circuit continue to track synchronization.

It is desirable that the synchronization acquiring apparatus further comprises first allocating synchronization tracking circuit selecting means for selecting one of said synchronization tracking circuits that is at rest as an allocating synchronization tracking circuit which is to track a new synchronizing position; second allocating synchronization tracking circuit for selecting one of said synchronization tracking circuits that is operating and specified by the first flag in the flag-off condition as the allocating synchronization tracking circuit when there is said synchronization tracking circuit specified by the first flag that is in the flag-on condition; and third allocating synchronization tracking circuit for selecting one of said synchronization tracking circuits that is operating and not the allocation inhibit synchronization tracking circuit as the allocating synchronization tracking circuit.

It is desirable that the synchronization acquiring apparatus further comprises third allocation inhibit synchronization tracking circuit selecting means for selecting from said synchronization tracking circuits specified by the second flags in the flag-off condition when the first flags are all in the flag-off condition one showing the greatest tracked correlation power as the allocation inhibit synchronization tracking circuit to have the selected synchronization tracking circuit continue to track synchronization.

It is desirable that the synchronization acquiring apparatus further comprises fourth allocation inhibit synchronization tracking circuit selecting means for selecting from said synchronization tracking circuits specified by the second flags in the flag-on condition when the first flags are all in the flag-off condition and the second flags are in the flag-on condition one showing the greatest tracked correlation power as the allocation inhibit synchronization tracking circuit to have the selected synchronization tracking circuit continue to track synchronization.

It is desirable that the synchronization acquiring apparatus further comprises: first allocating synchronization tracking circuit selecting means for selecting one of said synchronization tracking circuits that is at rest as an allocating synchronization tracking circuit which is to track a new synchronizing position; second allocating synchronization tracking circuit for selecting one of said synchronization tracking circuits that is operating and specified by the first flag in the flag-off condition as the allocating synchronization tracking circuit when there is said synchronization tracking circuit specified by the first flag that is in the flag-on condition; and fourth allocating synchronization tracking circuit for selecting from said synchronization tracking circuits that are operating and not defined as the allocation inhibit synchronization tracking circuit as the allocating synchronization tracking circuit one showing the smallest tracked correlation power as the allocating synchronization tracking circuit.

according to still another aspect of the present invention, there is provided a receiver for a spread spectrum communication system provided with an acquiring circuit that cyclically acquires synchronization of a plurality of signals received via multiple paths from a transmitter, with a spread code provided in the receiver, and a plurality of tracking circuits that track a given number of ones of the plurality of signals acquired by the acquiring circuit for demodulation, the receiver comprising: a judging circuit that judges whether propagation conditions of the given number of signals in a first cycle and in a second one of a plurality of cycles previous to the first cycle are higher than a given quality level or not; and a selecting circuit that, when the judging circuit judges a propagation condition of one of the given number signals in at least one of the first cycle and the second cycle is not higher than the given quality level, selects the given number of signals excluding the one signal that the tracking circuits should track in the first cycle, from the plurality of signals.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIGS. 3 to 7 show the operations of the synchronization acquiring apparatus;

FIG. 8 is a block diagram which shows a synchronization acquiring apparatus according to a first embodiment of the invention;

FIGS. 9(a) to 9(e) are explanatory views for explaining the operations of flags A(N) and B(N);

DESCRIPTION OF THE PREFERRED EMBODIMENTS

Best modes of carrying out the present invention will be described in further detail using various embodiments with reference to the accompanying drawings.

<First Embodiment>

A synchronization acquiring apparatus provided in the receiver for a spread spectrum communication system according to the present invention will now be described. The receiver in which the acquiring apparatus is provided receives a plurality of signals from the transmitter via a plurality of different paths formed between the transmitter and the receiver, combines those received signals, and demodulates the combined signal. Demodulating a combined signal that includes many received signals is desirable to improve the S/N ratio; however, demodulating a combined signal that includes only one received signal enables reproducing the information which exists in that received signal regardless of a poor SIN ratio. To implement such demodulation, the acquiring apparatus has a configuration as follows.

Figure 1:
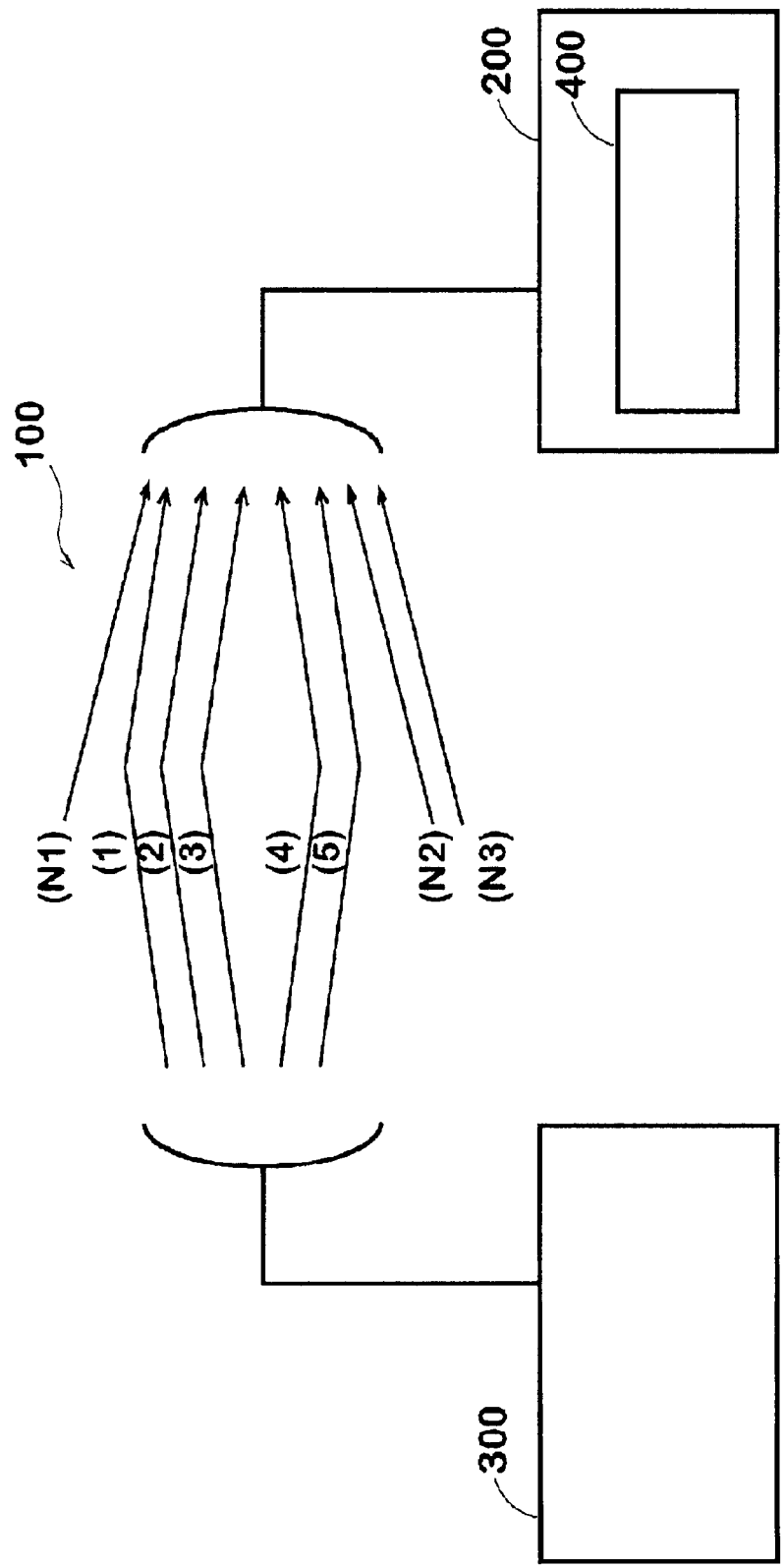
FIG. 1 shows the construction of a spread spectrum communication system according to the present invention.

FIG. 1 is a schematic block diagram showing the configuration of a signal sending/receiving system 100 according to a first embodiment in which the synchronization acquiring apparatus 400 of the present invention is employed. The signal sending/receiving system 100 of the first embodiment includes, for example, a spread-spectrum type mobile communication system provided with a receiver 200 having the synchronization acquiring apparatus 400 of the present invention, and may be operated, for example, as a mobile station. The system 100 also includes a transmitter 300 operated, for example, as a base station adapted to send out a signal containing information to be transmitted to the receiver 200. The transmitter 300, after spreading the signal containing the information to be transmitted by using a spread code such as a well-known PN code or Gold code, sends out the spread signal to the receiver 200. The receiver 200 receives the spread signal fed by the transmitter 300 and, by despreading the received spread signal using the same spread code as used for spreading the signal, demodulates the signal containing the information. Between the transmitter 300 and the receiver 200 exist a plurality of transmission paths that change every moment as the receiver 200 moves. Each of these transmission paths has a different distance and the receiver 200 receives a plurality of the spread signals sent through the plurality of the transmission paths from the transmitter 300. In FIG. 1, an example is shown in which the receiver 200 receives the plurality of the spread signals transmitted through a plurality of transmission paths (1) to (5) from the transmitter 300. The signal being received by the receiver and being transmitted through the transmission path (1) by the transmitter 300 is hereinafter referred to as a signal (1). Similarly, signals being received by the receiver and transmitted through the other transmission paths (2) to (5) are referred to as signals (2) to (5), respectively. FIG. 1 also shows that the receiver 200 would receive noises (N1), (N2) and (N3).

Figure 2:
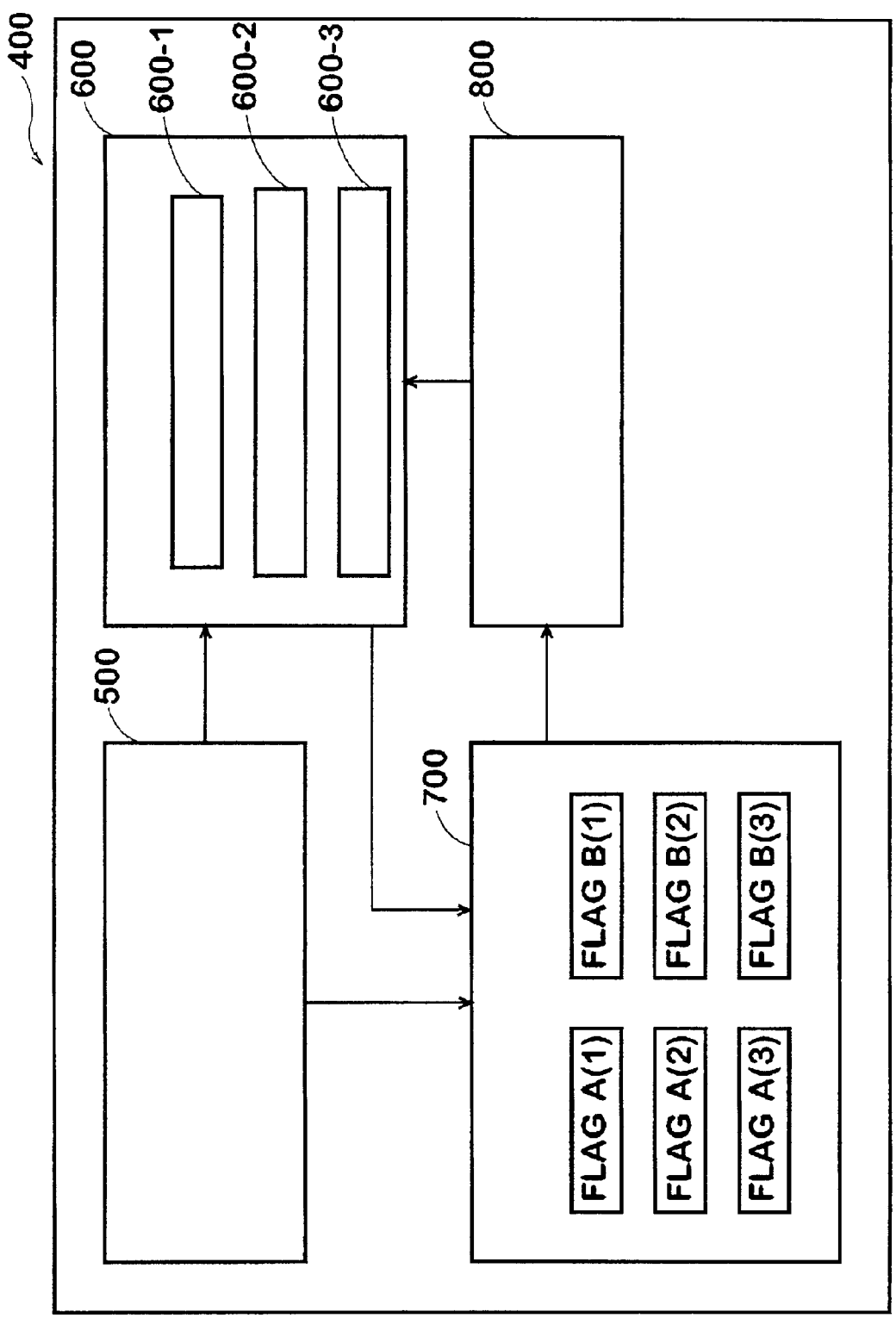
FIG. 2 shows the configuration of the synchronization acquiring apparatus in the receiver.

FIG. 2 is a schematic block diagram showing the configuration of the synchronization acquiring apparatus 400 of the first embodiment. As shown in FIG. 2, the synchronization acquiring apparatus 400 is provided with an acquiring circuit 500 used to acquire synchronization of the plurality of the received spread signals by calculating the correlation power of the spread signals. The apparatus 400 also includes a tracking circuit 600 used to track the synchronization of the spread signals acquired by the acquiring circuit 500, which has tracking units 600-1 to 600-3. In addition, the apparatus 400 includes a judging circuit 700 used to judge whether the present state of a transmission path through which the specified numbers of spread signals whose synchronization is being now tracked by the tracking circuit 600 are transmitted (that is, the present transmission state) is good or bad and whether a past state of the above transmission path (that is, a past transmission state) was good or bad. The apparatus 400 also includes a selecting circuit 800 that is used to permit, based on the judgment made by the judging circuit 700 as to whether the present and past transmission states of specified numbers of signals that have been tracked by the tracking unit 600 are good or bad, the tracking units 600-1 to 600-3 to start tracking the synchronization of any one of signals whose synchronization has been newly acquired by the acquiring circuit 500 or to continue tracking the synchronization of signals whose synchronization has been tracked by the tracking units 600-1 to 600-3.

The acquiring circuit 500, as is well known conventionally, acquires periodically and simultaneously the synchronization of the plurality of spread signals by calculating the correlation power of the spread signals. When the spread signal is despread by using the same spread codes as are employed in the transmitter 300, the level of the despread signal, that is, of the demodulated information signal becomes high, due to self correlation characteristics of spread codes. On the other hand, if the spread signal is despread by using different spread codes, the level of modulated information signal becomes very low. The acquiring circuit 500 estimates that an information signal having a level higher than a threshold value is a normal signal, that is, not a noise.

The tracking unit 600 is adapted to track, under control of the selecting circuit 800, the synchronization of signals whose numbers are the same as the specified numbers of the spread signals, out of the plurality of signals whose synchronization has been acquired by the acquiring circuit 500 and the plurality of signals whose synchronization has been tracked by the tracking unit 600.

Each of the tracking units 600-1 to 600-3 making up the tracking circuit 600, if the signal whose synchronization has been tracked until the present time by each of the tracking units 600-1 to 600-3 coincides with one of the plurality of signals whose synchronization has been newly acquired at present time by the acquiring circuit 500, continues tracking the synchronization of the signal whose synchronization has been tracked until the present time. On the other hand, if the signal does not coincide with the one described above, each of the tracking units 600-1 to 600-3 starts tracking the synchronization of signals selected by the selecting circuit 800 out of the plurality of the signals whose synchronization has been newly acquired at the preset time by the acquiring circuit 500, in lieu of signals whose synchronization has been acquired before the present time.

The judging circuit 700, in order to indicate the present and past transmission states of signals that are being tracked by the tracking units 600-1 to 600-2, is provided with a flag A (1) and a flag B (1) corresponding to the tracking unit 600-1, with a flag A (2) and flag B (2) corresponding to the tracking unit 600-2 and with a flag A (3) and flag B (3) corresponding to the tracking unit 600-3. The flag A (1) to flag A (3) are used to indicate present transmission states of signals whose synchronization is being tracked by the tracking units 600-1 to 600-3 while the flag B (1) to flag B (3) are used to indicate past transmission states of signals whose synchronization is being tracked by the tracking units 600-1 to 600-3. More concretely, the judging circuit 700, when the signal whose synchronization has been tracked until the present time by the tracking unit 600-1 coincides with one of a plurality of signals whose synchronization has been newly acquired at the present time by the acquiring circuit 500, for example, sets the flag A so as to indicate that "the signal is in a good condition" and when the signal whose synchronization has been tracked until the present time by the tracking unit 600-1 does not coincide with one of the plurality of the signals whose synchronization has been newly acquired at the present time by the acquiring circuit 500, sets the flag A so as to indicate that "the signal is not in a good condition".

The judging circuit 700, when, for example, the tracking unit 600-1 continues tracking the synchronization of the signal whose synchronization is being tracked at the present time, that is, when the synchronization of the signal was acquired before the present time two or more times, sets the flag B (1) so as to indicate that "the signal was in a good condition", while the judging circuit 700, when the tracking unit 600-1 starts tracking the synchronization of one of the signals out of a plurality of signals whose synchronization has been newly acquired by the acquiring circuit 500 at the present time, sets the flag B (1) so as to indicate that "the signal was not in a good condition."

The selecting circuit 800, based on the judgement made by the judging circuit 700 and indicated by the flags A (1) to A (3) and the flags B (1) to B (3) as to whether the present and past transmission states of signals whose synchronization is being tracked at the present time by the tracking units 600-1 to 600-3, are good or bad, selects a signal to cause the tracking units 600-1 to 600-3 to continue tracking the synchronization or a signal to cause the tracking units 600-1 to 600-3 to start tracking the synchronization, out of a plurality of signals whose synchronization is being tracked at the present time by the tracking units 600-1 to 600-3 or a plurality of signals whose synchronization has been newly acquired at present time by the acquiring circuit 500. That is, the selecting circuit 800 decides as to whether a continuation of the tracking by the tracking units 600-1 to 600-3, of the synchronization of the signal whose synchronization has been tracked until the present time by the tracking units 600-1 to 600-3, is allowed or not and as to whether a start of the tracking, by the tracking units 600-1 to 6003, of the synchronization of the signal whose synchronization has been newly acquired at the present time by the acquiring circuit 500 is allowed or not.

The operation of the signal sending/receiving system 100 of the first embodiment will be described below. The description is presented assuming that three signals whose synchronization is being tracked by the tracking units 600-1 to 600-3 temporarily vanish, for example, when signals are transmitted intermittently to reduce power consumption while sending signals. More particularly, explanations will be presented of an operation (I) in which the signal sending/receiving system 100 temporarily does not receive a specified number of signals whose synchronization is being tracked (in this example, three signals) and also does not receive three noises (N1) to (N3) as shown in FIG. 1, and operations (II) to (V) in which the signal sending/receiving system 100 temporarily does not receive three signals whose synchronization is being tracked, but receives the above three noises (N1) to (N3).

During the operation (II) described above, though, before the signal sending/receiving system 100 receives noises (N1) to (N3), the tracking of synchronization of three signals has already continued (that is, they have recently been tracked), and there is no signal whose synchronization has been newly commenced. During the operation (III) described above, before the signal sending/receiving system 100 receives the noises (N1) to (N3), the tracking of synchronization of two signals has already continued and the tracking of synchronization of one signal has been already started. During the operation (IV) described above, before the signal sending/receiving system 100 receives noises (N1) to (N3), the tracking of synchronization of one signal has already continued and the tracking of synchronization of two signals has been newly started. During the operation (V) described above, though, before the signal sending/receiving system 100 receives the noises (N1) to (N3), there is no signal for which the tracking of the synchronization has continued, the tracking of synchronization of three signals has been newly commenced.

Figure 3:
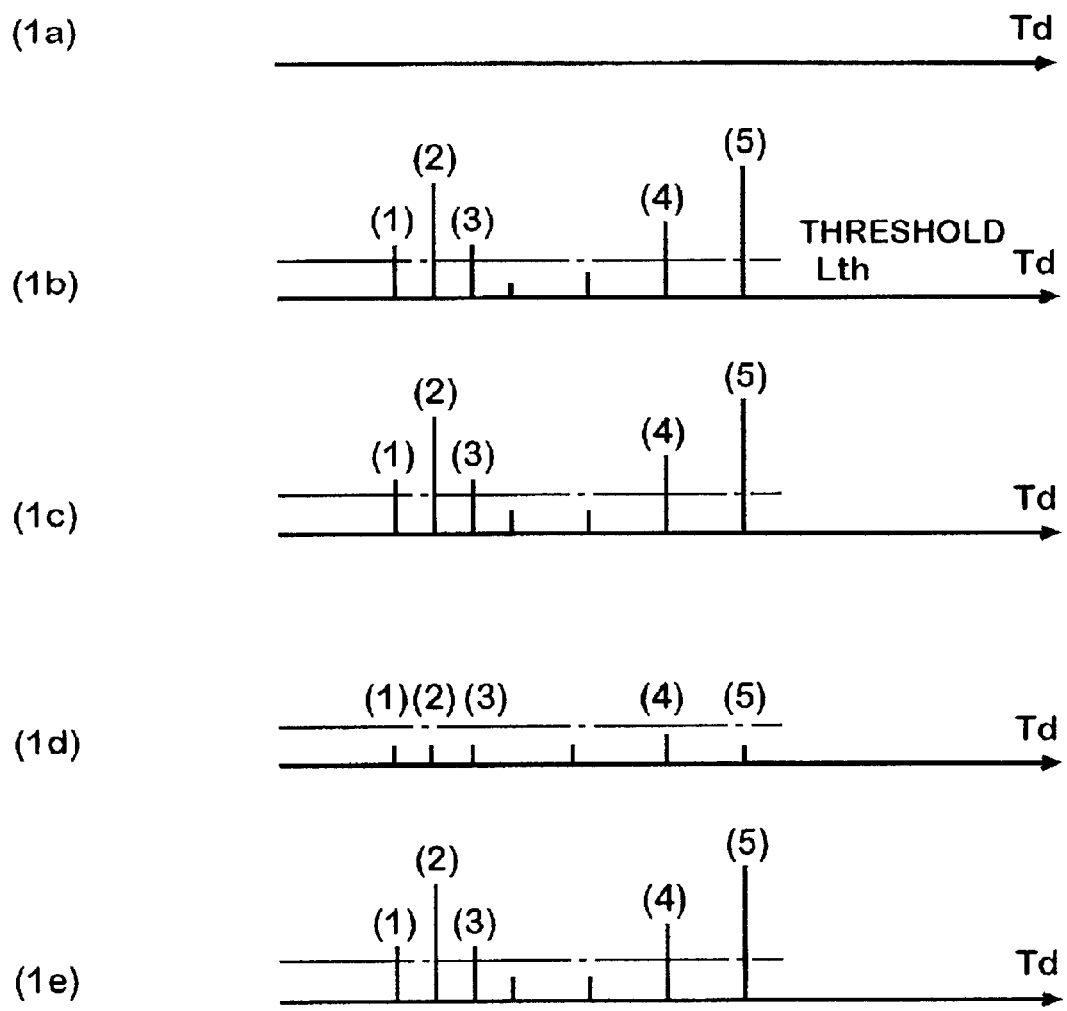

FIG. 3 shows the operation (I) in which the signal sending/receiving system 100 temporarily does not receive signals whose synchronization is being tracked and does not receive noises.

Cycle (1*a*): The receiver 200 does not receive any signal from the transmitter 300.

Cycle (1*b*): When the receiver 200 receives spread signals (1) to (5) sent from the transmitter 300, the acquiring circuit 500 acquires synchronization of the spread signals (1) to (5)

by calculating the correlation power of the spread signals. The acquiring circuit 500 notifies the judging circuit 700 about a specified number of the best signals out of those signals whose levels are higher than a threshold value Lth shown in FIG. 3, estimated to be normal signals from the viewpoint of self correlation characteristics of the spread codes. In this example, the best three signals are signals (2), (4) and (5). The judging circuit 700, after receiving the notification from the acquiring circuit 500, notifies the selecting circuit 800 that a first acquisition of the synchronization has been performed. The selecting circuit 800, in response to the notification from the judging circuit 700, permits the tracking units 600-1 to 600-3 to commence tracking the synchronization of signals (2), (4) and (5) and sets the flag B (1) corresponding to the tracking unit 600-1, the flag B (2) corresponding to the tracking unit 600-2 and the flag B (3) corresponding to the tracking unit 600-3 so as to indicate that "the signal was not in a good condition". This causes the tracking unit 600-1 to commence tracking the synchronization of the signal (2), the tracking unit 600-2 to commence tracking the synchronization of the signal (4) and the tracking unit 600-3 to commence tracking the synchronization of the signal (5).

Cycle (1c): The acquiring circuit 500, in the same manner as in the cycle (1b), notifies the judging circuit 700 of the existence of the best signals (2), (4) and (5). The judging circuit 700 judges whether each of the signals (2), (4) and (5) whose synchronization has been tracked by the tracking units 600-1 to 600-3 until the cycle (1c) coincides with any one of the best three signals (2), (4) and (5) whose synchronization has been newly acquired by the acquiring circle 500 in the cycle (1c).

For example, since the signal (2) whose synchronization has been tracked by the tracking unit 600-1 until the cycle (1c) coincides with the signal (2) whose synchronization was newly acquired by the acquiring circuit 500 in the cycle (1b), the judging circuit 700 sets the flag A (1) so as to indicate that "the signal is in a good condition". Similarly, the judging circuit 700 sets both the flag A (2) and flag A (3) so as to indicate that "the signal is in a good condition".

After the setting of the flags A (1) to A (3) by the judging circuit 700 has been completed, the selecting circuit 800 makes a reference to the flags A (1) to A (3). Since all the flags A (1) to A (3) indicate that "the signal is in a good condition", the selecting circuit 800 permits the tracking units 600-1 to 600-3 to continue tracking the synchronization of the signals (2), (4) and (5) whose synchronization is being tracked by the tracking units 600-1 to 600-3. By this permission, the tracking units 600-1 to 600-3 continues tracking the synchronization of signals whose synchronization has been tracked until the cycle (1c). Moreover, since the tracking unit 600-1 continues tracking of synchronization of the signals, the selecting circuit 800 sets the flag B (1) for the tracking unit 600-1 so as to indicate that "the signal was in a good condition" and, for the same reasons, sets the flags B (2) and B (3) that "the signal was in a good condition".

Cycle (1d): If the receiver 200 receives, for example, due to intermittent transmission, spread signals (1) to (5) whose level is lower than the threshold value Ltn, the acquiring circuit 500 cannot estimate that any one of spread signals is not a normal signal. Therefore, the acquiring circuit 500 notifies the judging circuit 700 that there exists no signal whose synchronization has been acquired and the judging circuit 700, in response to the notification from the acquiring circuit 500, notifies the selecting circuit 800 that there exists no signal whose synchronization has been acquired. The selecting circuit 800, in response to the notification from the judging circuit 700, permits the tracking units 600-1 to 600-3 to continue tracking the synchronization of signals (2), (4) and (5) whose synchronization has been tracked by the tracking units 600-1 to 600-3 until the cycle (1d).

Cycle (1e): If the receiver 200 again receives, after completion of the intermittent transmission, spread signals (I) to (5) whose level, after being despread, is larger than the threshold value Ltn, as in the case of the cycle (1e), the acquiring circuit 500 notifies the judging circuit 700 of the existence of the best signals (2), (4) and (5). The judging circuit 700 judges whether each of signals (2), (4) and (5) whose synchronization has been tracked until the cycle (1e) by the tracking units 600-1 to 600-3 coincides with any one of signals (2), (4) and (5) whose synchronization has been acquired by the acquiring circuit 500 in the cycle (1e). Since the signal (2) whose synchronization has been tracked by the tracking unit 600-1 until the cycle (1e) coincides with the signal (2) whose synchronization has been acquired by the acquiring circuit 500 in the cycle (1e), the judging circuit 700 sets the flag A (1) for the tracking unit 600-1 so as to indicate that "the signal is in a good condition". For the same reason, the judging circuit 700 sets the flags A (2) and A (3) so as to indicate that "the signal is in a good condition".

[0043] The selecting circuit 800, when the setting of the flags A (1) to A (3) by the judging circuit 700 has been completed, in the same manner as in the cycle (1c), makes a reference to the flags A (1) to A (3). Since all the flags A (1) to A (3) indicate that "the signal is in a good condition", the selecting circuit 800 permits the tracking units 600-1 to 600-3 to continue tracking the synchronization of signals (2), (4) and (5) whose synchronization has been tracked by the tracking units 600-1 to 600-3 until the cycle (1e). This permission causes the tracking units 600-1 to 600-3 to continue tracking the synchronization of the signals (2), (4) and (5) whose synchronization has been tracked until the cycle (1e). Since the tracking unit 600-1 is allowed to continue tracking the synchronization, the judging circuit 700 sets the flag B (1) for the tracking unit 600-1 so as to indicate that "the signal was in a good condition" and, for the same reason, the judging circuit 700 sets the flags B (2) and B (3) so as to indicate that "the signal was in a good condition".

FIG. 4 shows the operation (II) in which tracking of synchronization of three signals has already continued before noises (N1) to (N3) were received. However, there is no signal for which the tracking of synchronization has been newly commenced.

Cycles (2a) to (2c): Since operations in the cycles (2a) to (2c) are the same as those in the cycles (1a) to (1c) in the Operation (I), the synchronization acquiring apparatus 400 acts in the same manner as in the cycles (1a) to (1c). For example, since, in the cycle (2c), each of signals (2), (4) and (5) whose synchronization has been tracked by the tracking units 600-1 to 600-3 until the cycle (2c) coincides with any of signals (2), (4) and (5) whose synchronization was acquired by the acquiring circuit 500 in the cycle (2b), the judging circuit sets the flags A (1) to A (3) so as to indicate that "the signal is in a good condition". Moreover, since the tracking units 600-1 to 600-3 continue tracking the synchronization of the signals (2), (4) and (5) whose synchronization has been tracked by the tracking units 600-1 to 600-3 until the cycle (2c), the judging circuit 700 sets the flags B (1) to B (3) so as to indicate that "the signal was in a good condition".

Cycle (2d): When the transmission of the transmitter 300 is discontinued according to the intermittent tranmission, suppose that the receiver 200 receives three noises (N1) to (N3) whose level is larger than the threshold value Ltn. The acquiring circuit 500 therefore acquires synchronization of the three noises (N1) to (N3). The judging circuit 700 judges whether each of signals (2), (4) and (5) whose synchronization has been tracked by tracking units 600-1 to 600-3 until the cycle (2d) coincides with any one of noises (N1) to (N3) whose synchronization has been acquired by the acquiring circuit 500 in the cycle (2c). Since none of the signals (2), (4) and (5) whose synchronization has been tracked coincides with any of the noises (N1) to (N3), the judging circuit 700 sets the flags A (1) to A (3) so as to indicate that "the signal is not in a good condition".

After the judging circuit 700 has completed the setting of the flags A (1) to A (3), the selecting circuit 800 makes reference to the flags A (1) to A (3). Since all the flags A (1) to A (3) indicate that "the signal is not in a good condition", the selecting circuit 800 makes reference to the flags B (1) to B (3). Since all the flags B (1) to (3) indicate that "the signal was in a good condition", the selecting circuit 800 recognizes that past transmission states of the signals (2), (4) and (5) whose synchronization has been tracked by the tracking units 600-1 to 600-3 until the cycle (2d) were good. The selecting circuit 800, since it recognizes that the past transmission states of all the signals (2), (4) and (5) were good, permits the tracking units 600-1 to continue tracking the synchronization of an arbitrary signal out of signals (2), (4) and (5), for example, of the signal (2) and causes the other tracking units 600-2 or 600-3 to commence tracking the synchronization of an arbitrary two noises out of the noises (N1) to (N3) whose synchronization has been acquired. For example, suppose that noises (N1) and (N2) are to be tracked.

The judging circuit 700, since the above permission causes tracking unit 600-1 to continue tracking the synchronization of the signal, sets the flag B (1) so as to indicate that "the signal was in a good condition", but since the tracking units 600-2 and 600-3 have only started tracking the synchronization of the noise, it sets the flags B (2) and B (3) so as to indicate that "the signal is not in a good condition".

Cycle (2e): When the receiver 200, after resumption of the intermittent transmission, has again received spread signals (1) to (5) whose level, after being despread, is larger than the threshold value Ltn, the judging circuit 700 judges whether any of the best signals (2), (4) and (5) out of signals (1) to (5) whose synchronization has been acquired by the acquiring circuit 500 in the cycle (2e) coincides with any one of the signal (2) and noises (N1) and (N2) whose synchronization has been tracked by the tracking units 600-1 to 600-3 until the cycle (2e).

Since the signal (2) whose synchronization has been tracked coincides with the signal (2) whose synchronization has been acquired in the cycle (2), the judging circuit 700 sets the flag A (1) so as to indicate that "the signal is in a good condition", and since neither of the noises (N1) and (N2) whose synchronization has been tracked coincides with any of the signals (2), (4) and (5) whose synchronization has been acquired, the judging circuit 700 sets the flags A (2) and A (3) so as to indicate that "the signal is not in a good condition".

The selecting circuit 800, when the judging circuit 700 has completed the setting of the flags A (1) to A (3), makes reference to the flags A (1) to A (3). Since the flag A (1) indicates that "the signal is in a good condition", the selecting circuit 800 permits the tracking unit 600-1 to continue tracking the synchronization of the signal (2). On the other hand, since the flags A (2) and A (3) indicate that "the signal is not in a good condition", the selecting circuit 800 permits the tracking units 600-2 and 600-3 to commence tracking the synchronization of other signals (4) and (5). This permission causes the tracking unit 600-1 to continue tracking the synchronization of the signal (2) and the tracking units 600-2 and 600-3 to commence tracking the synchronization of signals (4) and (5).

Since the tracking unit 600-1 continues tracking the synchronization, the judging circuit 700 sets the flag B (1) so as to indicate that "the signal was in a good condition", while the judging circuit 700, since the tracking units 600-2 and 600-3 commence tracking the synchronization, sets the flags B (2) and B (3) so as to indicate that "the signal was not in a good condition".

In the above cycle (2d), the selecting circuit 800, instead of selecting an arbitrary signal (2) out of signals (2), (4) and (5) whose synchronization has been tracked until the cycle (2d), preferably selects a better signal, based on the level of each of signals (2), (4) and (5), that is, the power level of each of the signals (2), (4) and (5) that can be calculated during the course of the tracking of the synchronization by the tracking unit 600 or the power level of each of the signals (2), (4) and (5) that can be calculated during the course of the acquisition of the synchronization by the acquiring circuit 500.

Figure 5:
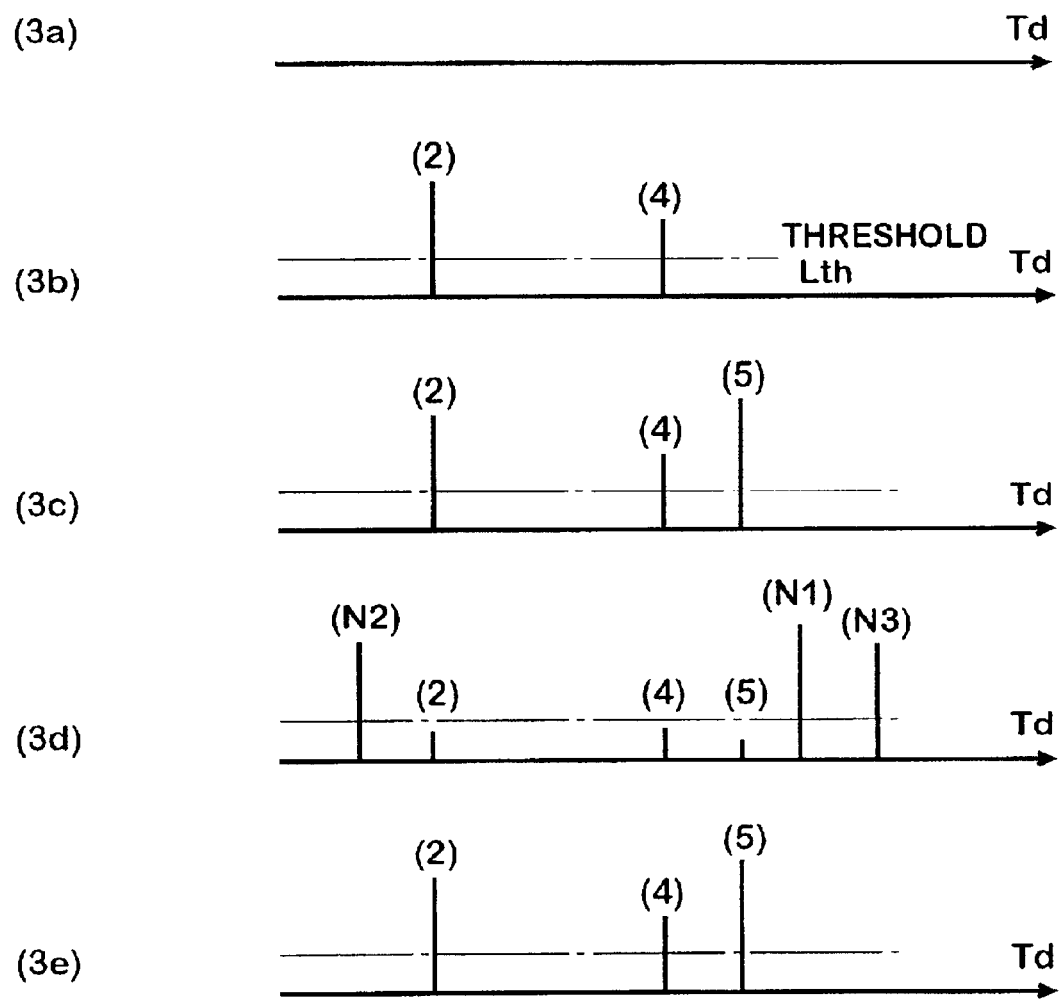

FIG. 5 shows the operation (III) in which tracking of synchronization of two signals has been already continued before noises (N1) to (N3) are received and tracking of synchronization of one signal has been newly started.

Cycle (3a): The receiver 200 has not yet received any signal from the transmitter 300.

Cycle (3b): When the receiver 200 has received spread signals (2) and (4) from the transmitter 300, as in the case of the cycle (1b) for the operation (I), the tracking units 600-1 and 600-2 commence tracking the synchronization of signals (2) and (4) and the judging circuit 700 sets the flags B (1) and B (2) so as to indicate that "the signal was not in a good condition".

Cycle (3c): When the receiver 200 has received the spread signal (5), in addition to the spread signals (2) and (4), the acquiring circuit 500 acquires the synchronization of these signals (2), (4) and (5). The judging circuit 700 judges whether each of signals (2) and (4) whose synchronization has been tracked by the tracking units 600-1 and 600-2 until the cycle (3c) coincides with any of signals (2), (4) and (5) whose synchronization has been acquired by the acquiring circuit 500 in the cycle (3c). Since the signals (2) and (4) whose synchronization has been tracked coincide with signals (2) and (4) out of the signals (2), (4) and (5) whose synchronization has been acquired, the judging circuit 700 sets the flags A (1) and A (2) so as to indicate that "the signal is in a good condition".

When the judging circuit 700 has completed the setting of the flags A (1) to A (3), the selecting circuit 800 makes a reference to the flags A (1) to A (3). Since the flags A (1) and (2) indicate that "the signal is in a good condition", the selecting circuit 800 permits the tracking units 600-1 and 600-2 to continue tracking the synchronization of signals (2) and (4). On the other hand, the selecting circuit 800 permits the tracking units 600-3 to commence tracking the synchronization of the signal (5) whose synchronization has been acquired for the first time in the cycle (3c). This permission causes the tracking units 600-1 and 600-2 to continue tracking the synchronization and the tracking unit 600-3 to commence tracking the synchronization. Since the tracking units 600-1 and 600-2 continue tracking the synchronization, the judging circuit 700 sets the flags B (1)

and B (2) so as to indicate that "the signal was in a good condition" and the flags B (3) so as to indicate that "the signal was not in a good condition".

Cycle (3d): If the receiver 200 receives, due to intermittent transmission, spread signals (2), (4) and (5) whose level after being despread is lower than the threshold value Lth and, at the same time, noises (N1), (N2) and (N3), the acquiring circuit 500 acquires the synchronization of the noises (N1), (N2) and (N3) by the despreading processing. The judging circuit 700 judges whether each of signals (2), (4) and (5) whose synchronization has been tracked by the tracking units 600-1 to 600-3 until the cycle (3d) coincides with any of noises (N1), (N2) and (N3) whose synchronization has been acquired by the acquiring circuit 500 in the cycle (3d). Since none of the signals (2), (4) and (5) whose synchronization has been tracked coincides with any of the noises (N1), (N2) and (N3), the judging circuit 700 sets all the flags A (1) to A (3) so as to indicate that "the signal is not in a good condition".

When the judging circuit 700 has completed the setting of the flags A (1) to A (3), the selecting circuit 800 makes a reference to the flags A (1) to A (3). Since all the flags A (1) to A (3) indicate that "the signal is not in a good condition", the selecting circuit 800 makes a reference to flags B (1) to B (3). Since the flags B (1) and B (2) indicate that "the signal was in a good condition", the selecting circuit 800 permits the tracking units 600-1 to 600-2 to continue tracking the synchronization of signals (2) and (4). Also, since the flag B (3) indicates that "the signal was not in a good condition", the judging circuit 700 permits the tracking unit 600-3 to commence tracking the synchronization of any one of noises of (N1), (N2) and (N3) whose synchronization has been acquired (for example, the noise (N1)) instead of the signal (5) whose synchronization has been tracked. This permission causes the tracking units 600-1- and 600-2 to continue tracking the synchronization, so the judging circuit 700 sets the flags B (1) and B (2) so as to indicate that "the signal was in a good condition", and since the permission causes the tracking unit 600-3 to commence tracking the synchronization, the judging circuit 700 sets the flag B (3) so as to indicate that "the signal was not in a good condition".

Cycle (3e): After completion of the pause in the intermittent transmission, the receiver 200 receives spread signals (2), (4) and (5), whose level after being despread is larger than the threshold value Ltn, and if it does not also receive noises (N1), (N2) and (N3), the acquiring circuit 500 acquires the synchronization of signals (2), (4) and (5). The judging circuit 700 judges whether each of signals (2) and (4) and of the noise (N1) whose synchronization has been tracked by the tracking units 600-1 to 600-3 until the cycle (3e) coincides with any of signals (2), (4) and (5) whose synchronization has been acquired by the acquiring circuit 500 in the cycle (3e).

Since the signals (2) and (4) whose synchronization has been tracked by the tracking units 600-1 and 600-2 coincide with signals (2) and (4) whose synchronization has been acquired by the acquiring circuit 500, the judging circuit sets the flags A (1) and A (2) so as to indicate that "the signal is in a good condition". Since the noise (N1) whose synchronization has been tracked by the tracking unit 600-3 does not coincide with any one of the signals (2), (4) and (5) whose synchronization has been acquired, the judging circuit 700 sets the flag A (3) so as to indicate that "the signal is not in a good condition".

When the judging circuit 700 has completed the setting of the flags A (1) to A (3), the selecting circuit 800 makes reference to the flags A (1) to A (3). Since the flags A (1) and A (2) indicate that "the signal is in a good condition", the selecting circuit 800 permits the tracking units 600-1 to 600-2 to continue tracking the synchronization of signals (2) and (4). Moreover, since the flag A (3) indicates that "the signal is not in a good condition", the selecting circuit 800 permits the tracking unit 600-3 to commence tracking the synchronization of the signal other than the signals (2) and (4) out of signals (2), (4) and (5) whose synchronization has been acquired in the cycle (3e). In this example, that is the signal (5).

Since the tracking units 600-1 and 600-2 continue tracking the synchronization, the judging circuit 700 sets the flags B (1) and B (2) so as to indicate that "the signal was in a good condition", and since the tracking unit 600-3 commences tracking the synchronization, the judging circuit 700 sets the flag B (3) so as to indicate that "the signal was in a good condition".

FIG. 6 shows the operation (IV) in which tracking of synchronization of one signal has been already continued before noises (N1) to (N3) are received and tracking of synchronization of two signals has been newly started.

Cycle (4a): The receiver 200 has not received any signal from the transmitter 300.

Cycle (4b): When the receiver 200 has received the spread signal (2), as in the cycle (3b) for the operation (III) described above, the tracking unit 600-1 commences tracking the synchronization of the signal (2) and the judging circuit 700 sets the flag B (1) so as to indicate that "the signal was not in a good condition".

Cycle (4c): When the receiver 200 has received the spread signals (4) and (5) in addition to the spread signal (2), the acquiring circuit 500 acquires the synchronization of signals (2), (4) and (5). The judging circuit 700 judges whether the signal (2) whose synchronization has been tracked by the tracking unit 600-1 until the cycle (4b) coincides with any of signals (2), (4) and (5) whose synchronization has been acquired by the acquiring circuit 500 in the cycle (4c). Since the signal (2) whose synchronization has been tracked coincides with the signal (2) whose synchronization has been acquired, the judging circuit 700 sets the flag A (1) so as to indicate that "the signal is in a good condition".

The tracking units 600-2 and 600-3, as in the cycle (4b) described above, commence tracking the synchronization of the signals other than the signals (2) out of signals (2), (4) and (5) whose synchronization has been acquired, that is, of the signal (4) and (5). Since the tracking unit 600-1 continues the synchronization, the judging circuit 700 sets the flag B (1) so as to indicate that "the signal was in a good condition", and since the tracking units 600-1 and 600-2 start tracking the synchronization, the judging circuit 700 sets the flag B (3) so as to indicate that "the signal was not in a good condition".

Cycle (4d): If the receiver 200 receives, due to intermittent transmission, spread signals (2), (4) and (5) whose level is lower than the threshold value Ltn, and noises (N1), (N2) and (N3) whose level is larger than the threshold value Lth, the acquiring circuit 500 acquires the synchronization of the noises (N1), (N2) and (N3). The judging circuit 700 judges whether each of signals (2), (4) and (5) whose synchronization has been tracked by the tracking units 600-1 to 600-3 until the cycle (4d) coincides with any of noises (N1), (N2) and (N3) acquired by the acquiring circuit 500 in the cycle (4d). Since the judging circuit 700 judges that none of the signals (2), (4) and (5) whose synchronization has been tracked coincides with any of the noises (N1), (N2) and (N3) whose synchronization has been acquired, it sets the flags A (1) to A (3) so as to indicate that "the signal is not in a good condition".

When the judging circuit 700 has completed the setting of the flags A (1) to A (3), the selecting circuit 800 makes reference to the flags A (1) to A (3). Since all the flags A (1) to A (3) indicate that "the signal is not in a good condition", the selecting circuit 800 makes reference to the flags B (1) and B (3). Since the flag B (1) indicates that "the signal was in a good condition", the selecting circuit 800 permits the tracking units 600-1 to continue tracking the synchronization of signals (2), and since the flags B and B (3) indicate that "the signal was not in a good condition", it permits the tracking units 600-1 and 600-2 to commence tracking the synchronization of any one of the noises (N1), (N2) and (N3) (for example, noises (N1) and (N2) instead of signals (4) and (5) whose synchronization has been tracked. Since the permission causes the tracking unit 600-1 to continue tracking the synchronization, the judging circuit 700 sets the flag B (1) so as to indicate that "the signal was in a good condition", and since this permission causes the tracking units 600-2 and 600-3 to commence tracking the synchronization, the judging circuit 700 sets the flags B (2) and B (3) so as to indicate that "the signal was not in a good condition".

Cycle (4e): After the completion of the pause in the intermittent transmission, if the receiver 200 receives spread signals (2), (4) and (5) whose level is larger than the threshold value Ltn and does not receive the noises (N1), (N2) and (N3), the acquiring circuit 500 acquires the synchronization of signals (2), (4) and (5). The judging circuit 700 judges whether each of signals (2) and noises (N1) and (N2) whose synchronization has been tracked by the tracking units 600-1 to 600-3 until the cycle (4e) coincides with any of signals (2), (4) and (5) whose synchronization has been acquired by the acquiring circuit 500 in the cycle (4e).

Since the signal (2) whose synchronization has been tracked coincides with the signal (2) whose synchronization has been acquired, the judging circuit 700 sets the flag A (1) so as to indicate that "the signal is in a good condition", and since the noises (N1) and (N2) whose synchronization has been tracked do not coincide with any one of the signals (2), (4) and (5) whose synchronization has been acquired, it sets the flag A (3) so as to indicate that "the signal is not in a good condition".

When the judging circuit 700 has completed the setting of the flags A (1) to A (3), the selecting circuit 800 makes reference to the flags A (1) to A (3). Since the flag A (1) indicates that "the signal is in a good condition", the selecting circuit 800 permits the tracking unit 600-1 to continue tracking the synchronization of the signal (2). On the other hand, since the flag A (3) indicates that "the signal is not in a good condition", the selecting circuit 800 permits the tracking units 600-2 and 600-3 to commence tracking the synchronization of the signal other than the signal (2) out of the signals (2), (4) and (5) whose synchronization has been acquired, that is, of the signals (4) and (5). Since the above permission causes the tracking unit 600-1 to continue tracking the synchronization, the judging circuit 700 sets the flag B (1) so as to indicate that "the signal was in a good condition". Moreover, the judging circuit 700, since the above permission causes the tracking units 600-1 and 600-2 to commence tracking the synchronization, sets the flags B (2) and B (3) so as to indicate that "the signal was not in a good condition".

FIG. 7 shows the operation (V) in which there is no signal whose synchronization had been continued before receipt of the noises (N1) to (N3), but the tracking of synchronization of three signals has been newly started.

Cycle (5a): The receiver 200 has not received any signal from the transmitter 300.

Cycle (5b): The receiver 200, as in the cycle (5a), has not received any signal from the transmitter 300.

Cycle (5c): When the receiver 200 has received the spread signals (2), (4) and (5), the acquiring circuit 500 acquires the synchronization of the signals (2), (4) and (5) by calculating correlation power of the signals (2), (4), and (5). In the same manner as in the cycle (1b) for the operation (I), the tracking units 600-1 to 600-3 commence tracking the synchronization of the signals (2), (4) and (5) and the judging circuit 700 sets the flags B (1) to B (3) so as to indicate that "the signal was not in a good condition".

Cycle (5d): If the receiver 200 receives, due to intermittent transmission, spread signals (2), (4) and (5) whose level is lower than the threshold value Ltn and noises (N1), (N2) and (N3) whose level is larger than the threshold value Ltn, the acquiring circuit 500 acquires the synchronization of noises (N1), (N2) and (N3). The judging circuit 700 judges whether each of the signals (2), (4) and (5) whose synchronization has been tracked by the tracking units 600-1 to 600-3 until the cycle (5b) coincides with any of the noises (N1), (N2) and (N3) whose synchronization has been acquired by the acquiring circuit 500 in the cycle (5b). Since the signal (2) whose synchronization has been tracked does not coincide with any of the noises (N1), (N2) and (N3) whose synchronization has been acquired, the judging circuit 700 sets the flag A (1) so as to indicate that "the signal is not in a good condition". For the same reason, the judging circuit 700 also sets the flags A (2) and A (3) so as to indicate that "the signal is not in a good condition".

When the judging circuit 700 has completed the setting of the flags A (1) to A (3), the selecting circuit 800 makes reference to the flags A (1) to A (3). Since all the flags A (1) to B (3) indicate that "the signal is not in a good condition", the selecting circuit 800 makes reference to the flags B (1) to B (3). Since all the flags B (1) to B (3) indicate that "the signal was not in a good condition", the selecting circuit 800 permits the tracking unit 600-1 which has tracked the synchronization of the signal (2) to continue tracking the synchronization of one of the signals (2), (4) and (5) (for example, the above signal (2)). The selecting circuit 800 permits the remaining tracking units 600-2 and 600-3 to commence tracking the synchronization of any one of the noises (N1), (N2) and (N3) whose synchronization has been acquired, for example, of the noises (N1) and (N2).

Since the tracking unit 600-1 continues tracking the synchronization by the above permission, the judging circuit 700 sets the flag B (1) so as to indicate that "the signal was in a good condition", and since the tracking units 600-2 and 600-3 commence tracking the synchronization, it sets the flags B (2) and B (3) so as to indicate that "the signal was not in a good condition".

Cycle (5e): After the completion of the pause in the intermittent transmission, if the receiver 200 receives spread signals (2), (4) and (5) whose level is larger than the threshold value Ltn and does not receive the noises (N1), (N2) and (N3), the acquiring circuit 500 acquires the synchronization of signals (2), (4) and (5). The judging circuit 700 judges whether each of signals (2) whose synchronization has been tracked by the tracking units 600-1 to 600-3 until the cycle (5e) and noises (N1) and (N2) coincides with any of the signals (2), (4) and (5) whose synchronization has been acquired by the acquiring circuit 500 in the cycle (5e). Since the signal (2) whose synchronization has been tracked coincides with the signal (2) whose synchronization has been acquired, the judging circuit 700 sets the flag A (1) so as to indicate that "the signal is in a good condition". On the other hand, since the noise (N1) whose synchronization has been tracked does not coincide with any one of signals (2), (4) and (5) whose synchronization has been acquired, the judging unit 700 sets the flag A (2) so as to indicate that "the signal is not in a good condition" and, for the same reason, it sets the flag A (3) so as to indicate that "the signal is not in a good condition".

When the judging circuit 700 has completed the setting of the flags A (1) to A (3), the selecting circuit 800 makes reference to the flags A (1) to A (3). Since the flag A (1) indicate that "the signal is in a good condition", the selecting circuit 800 permits the tracking unit 6001 to continue tracking the synchronization of the signal (2). On the other hand, since the flags A (1) and A (2) indicate that "the signal is not in a good condition", the selecting unit 800 permits the tracking units 600-2 and 600-3 to commence tracking the synchronization of the signal other than the signal (2) out of the signals (2), (4) and (5) whose synchronization has been acquired (that is, the signals (4) and (5)). Since the tracking unit 600-1 continues tracking the synchronization by the above permission, the judging circuit 700 sets the flag B (1) so as to indicate that "the signal was in a good condition", and since the tracking units 600-2 and 600-3 commence tracking the synchronization, the judging circuit 700 sets the flags B (2) and B (3) so as to indicate that "the signal is not in a good condition".

As described above, in the signal sending/receiving system 100 of the first embodiment of the present invention, every time the acquiring circuit 500 acquires the synchronization of signals, the judging circuit 700 judges whether each of a plurality of signals whose synchronization has been tracked until the present time coincides with any of a plurality of signals whose synchronization has been acquired by the acquiring circuit 500 (that is, whether the present transmission state of signals whose synchronization has been tracked is good or not). The judging circuit 700 also judges whether tracking of synchronization of the plurality of signals whose synchronization has been tracked was continued or not. A judgment is also made as to whether the past transmission state was good or not. Moreover, the selecting circuit 800, based on the present and past transmission states of signals whose synchronization has been tracked which has been judged by the judging circuit 700, determines signals whose synchronization should be tracked and signals whose synchronization should be started. This allows the selecting circuit 800 to determine, based on the past transmission state of signals whose synchronization has been tracked, those signals whose synchronization should be continued (out of signals whose synchronization has been tracked), even if the signal whose synchronization has been tracked should vanish temporarily. This would occur, for example, during a pause in an intermittent transmission, thereby avoiding a situation in which normal signals cannot be demodulated at all until new acquisition or tracking of the synchronization has been completed, as has occurred in the conventional technology.

<Second Embodiment>

FIG. 8 shows a synchronization acquiring apparatus according to the second embodiment of the invention.

The synchronization acquiring apparatus includes generally a synchronization acquiring circuit 1, a first synchronization tracking circuit 2, a second synchronization tracking circuit 3, and a third synchronization tracking circuit 4.

The synchronization acquiring circuit 1 includes a correlation determining circuit 11 and an allocation control circuit 12 and is designed to provide flags A(1), B(1), A(2), B(2), A(3), and B(3). The correlation determining circuit 11 is responsive to a received signal S10A to output a synchronizing position signal S11A. The allocation control circuit 12 receives the synchronizing position signal S11A from the correlation determining circuit 11, a tracked synchronizing position S13A from a first synchronization tracking circuit 2, as will be described later, and a tracked synchronizing position signal S14A from a second synchronization tracking circuit 3, and a tracked synchronizing position signal S15A from a third synchronization tracking circuit 4. The allocation control circuit 12 also provides allocating synchronizing position signals S12A, S12B, and S12C to the first, second, and third synchronization tracking circuits 2, 3, and 4, respectively.

The flag A, being the first flag, indicates by flag-on that the probability that the signal that the tracking circuit is tracking is not a noise but a signal transmitted from the transmitter is large, that is, the signal that the tracking circuit is tracking is reliable, when the signal that the tracking circuit is tracking coincides with a signal that the acquiring circuit newly acquires.

The flag B, being the second flag, indicates by flag-off that the signal that the tracking circuit is tracking is not a signal that the acquiring circuit newly acquires, that is, that the tracking circuit does not just commence tracking, when so.

Specifically, the flag A(1) is turned on upon start of a synchronization acquiring operation, while it is turned off when a synchronizing position of a reception response contained in the received signal S10A agrees with a synchronizing position being tracked by the first synchronization tracking circuit 2.

The flag B(1) is turned on when a synchronizing position is allocated to the first synchronization tracking circuit 2, while it is turned off during a subsequent synchronization acquiring operation when a synchronizing position of a reception response contained in the received signal S10A agrees with a synchronizing position being tracked by the first synchronization tracking circuit 2. The flag B(1) is kept off until the next synchronizing position is allocated to the first synchronization tracking circuit 2.

The flag A(2) is turned on upon start of the synchronization acquiring operation, while it is turned off when a synchronizing position of a reception response contained in the received signal S10A agrees with a synchronizing position being tracked by the second synchronization tracking circuit 3.

The flag B(2) is turned on when a synchronizing position is allocated to the second synchronization tracking circuit 3, while it is turned off during a subsequent synchronization acquiring operation when a synchronizing position of a reception response contained in the received signal S10A agrees with a synchronizing position being tracked by the second synchronization tracking circuit 3. The flag B(2) is kept off until the next synchronizing position is allocated to the second synchronization tracking circuit 3.

The flag A(3) is turned on upon start of the synchronization acquiring operation, while it is turned off when a synchronizing position of a reception response contained in the received signal S10A agrees with a synchronizing position being tracked by the third synchronization tracking circuit 4.

The flag B(3) is turned on when a synchronizing position is allocated to the third synchronization tracking circuit 4, while it is turned off during a subsequent synchronization acquiring operation when a synchronizing position of a reception response contained in the received signal S10A agrees with a synchronizing position being tracked by the third synchronization tracking circuit 4. The flag B(3) is kept off until the next synchronizing position is allocated to the third synchronization tracking circuit 4.

In the following discussion, each of the flags A(1), A(2), and A(3) will generally be referred to as a flag A(N), each of the flags B(1), B(2), and B(3) will generally be referred to as a flag B(N), and each of the first, second, and third synchronization tracking circuits 2, 3, and 4 will generally referred to as a synchronization tracking circuit N.

A difference in operation between the flags A(N) and B(N) will be discussed in detail below with reference to FIGS. 9(a) to 9(e).

In FIGS. 9(a) to 9(e), the ordinate axis indicates the level of a signal, and the abscissa axis indicates the time.

FIG. 9(a) shows a synchronizing position which is now being tracked by the synchronization tracking circuit N. The synchronization acquiring operation is assumed to start from this time. Although not shown in the drawing, the flag A(N) is cleared to 0 (i.e., off). Subsequently, when the received signal S10A, as shown in FIG. 9(b), is inputted to the synchronization tracking circuit N, a synchronizing position tracked by the synchronization tracking circuit N agrees with a synchronizing position of a reception response (2), so that the flag A(N) becomes 1 (i.e., on). If the synchronizing position of the reception response (2) is simultaneously assigned to the synchronization tracking circuit N, the flag B(N) becomes 1 (i.e., on).

In summary, at the time of FIG. 9(b), since the synchronization tracking position (2) based upon the synchronization position (2) obtained at the time of FIG. 9(a) coincides with the synchronization position (2) newly obtained at the time of FIG. 9(b), the flag A of the signal (2) is set to flag-on. On the other hand, the flags A of the signals (4) and (5) remain flag-off.

Upon initiation of a subsequent synchronization acquiring operation, the flag A(N) is cleared to 0 (i.e., off). At this time, the path is not changed. If the received signal S10A, as shown in FIG. 9(c), that is substantially identical with the one shown in FIG. 9(b) is inputted to the synchronization tracking circuit N, the synchronizing position tracked by the synchronization tracking circuit AT agrees with the synchronizing position of the reception response (2), so that the flag A(N) becomes 1 (i.e., on), and the flag B(N) becomes 0 (i.e., off). Specifically, the flag B(N) becomes 0 (i.e., off) when the synchronizing position tracked by the synchronization tracking circuit N agrees with the synchronizing position of the reception response (2) two times and is kept off until a subsequent synchronizing position is assigned.

In summary, at the time of FIG. 9(c), since the synchronization tracking position (2) based upon the synchronization position (2) obtained at the time of FIG. 9(b) coincides with the synchronization position (2) newly obtained at the time of FIG. 9(c), the flag A of the signal (2) is set to flag-on. Since the synchronization tracking position (2) at the time of FIG. 9(c) is not based upon the synchronization position (2) newly obtained at the time of FIG. 9(c) but is based upon the synchronization tracking position (2) obtained at the time of FIG. 9(b), the flag B of the signal (2) is set to flag-off.

On the other hand, at the time of FIG. 9(c), since the synchronization tracking position (4) at the time of FIG. 9(c) based upon the synchronization position (4) obtained at the time of FIG. 9(b) coincides with the synchronization position (4) newly obtained at the time of FIG. 9(c), the flag A of the signal (4) is set to flag-on. For the same reason, the flag A of the signal (5) is set to flag-on. In this way, at the time of FIG. 9(c), all the flags A of the signals (2), (4), and (5) are set to flag-on while the flags B thereof are set to flag-off, flag-on, and flag-on, respectively.

Upon initiation of a subsequent synchronization acquiring operation, the flag A(N) is turned off. If a transmission station stops, as shown in FIG. 9(d), transmitting a signal, it will cause the reception response to disappear from a synchronizing position tracked by the synchronization tracking circuit N, so that the flag A(N) is turned off. The flag B(N) is, however, kept off.

In summary, at the time of FIG. 9(d), since there is neither the synchronization position (2) nor the synchronization tracking position (2), it is considered that the synchronization tracking position (2) at the time of FIG. 9(d) based upon the synchronization position (2) at the time of FIG. 9(c) and the synchronization position (2) newly obtained at the time of FIG. 9(d) differ from each other. Consequently, the flag A of the signal (2) is set to flag-off. For the same reason, the flags A of the signals (4) and (5) are set to flag-off. Thereby, at the time of FIG. 9(d), all the flags A of the signals (2), (4), and (5) are flag-off.

Upon initiation of a subsequent synchronization acquiring operation, the flag A(N) is turned off. Assume that the transmission station resumes transmitting a signal, the path is not changed, and the received signal S10A, as shown in FIG. 9(e), that is substantially identical with the one shown in FIG. 9(c) is inputted to the synchronization tracking circuit N. The synchronizing position tracked by the synchronization tracking circuit N agrees with the synchronizing position of the reception response (2), so that the flag A(N) becomes on. The flag B(N) is kept off.

In summary, at the time of FIG. 9(e), upon confirmation that the flag B of the signal (2) is flag-off, tracking of the signal (2) is continued immediately without commencement of acquiring the signal (2). Similarly, upon confirmation that the flags B of the signals (4) and (5) are not flag-off but flag-on, tracking the signals (4) and (5) are not done.

Here, at the time of FIG. 9(e), for example, assuming that there are signals (6) and (7) (not shown) other than the signals (1)–(5) both of which are larger than those signals (1)–(5), these two signals (6) and (7) are acquired, whereby the signals (2), (6), and (7) are combined to be demodulated. Thus, the signal whose probability of being a transmission signal is large is used for the demodulation.

Referring back to FIG. 8, the first synchronization tracking circuit 2 receives the received signal S10A and the allocating synchronizing position signal S12A to perform the synchronization tracking operation and outputs the tracked synchronizing position signal S13A. The second synchronization tracking circuit 3 receives the received signal S10A and the allocating synchronizing position signal S12B to perform the synchronization tracking operation and outputs the tracked synchronizing position signal S14A. The third synchronization tracking circuit 4 receives the received signal S10A and the allocating synchronizing position signal S12C to perform the synchronization tracking operation and outputs the tracked synchronizing position signal S15A.

The operations of the synchronization acquiring apparatus of the second embodiment will be discussed below in detail.

1 Synchronizing Position Selection

This operation is performed by the allocation control circuit 12. Specifically, the allocation control circuit 12 receives a signal (e.g., the received signal in FIG. 9(b)) containing a plurality of reception responses (also referred to as sjmchronizing position candidates below) from the correlation determining circuit 11 to select three of the reception responses in the order of magnitude of correlation power. The reception response being tracked effectively is, however, excepted. The selected reception responses will be defined here as an allocating synchronizing position.

2 Synchronization Tracking Circuit Selection

This operation is to allocate the allocating synchronizing positions selected by the synchronizing position selecting operation, as discussed above, to select the synchronization tracking circuit for tracking the synchronization. Therefore, the synchronization tracking circuit which is now tracking the effective synchronization is excepted from the selection. The synchronization tracking circuit excepted by this operation will be referred to below as an allocation inhibit synchronization tracking circuit.

3 Synchronizing Position Allocation

This operation is to allocate the allocating synchronizing positions to the synchronization tracking circuits other than the allocation inhibit synchronization tracking circuit.

The above operations will be described below with reference to flowcharts as shown in FIGS. 10 to 13.

Figure 10:
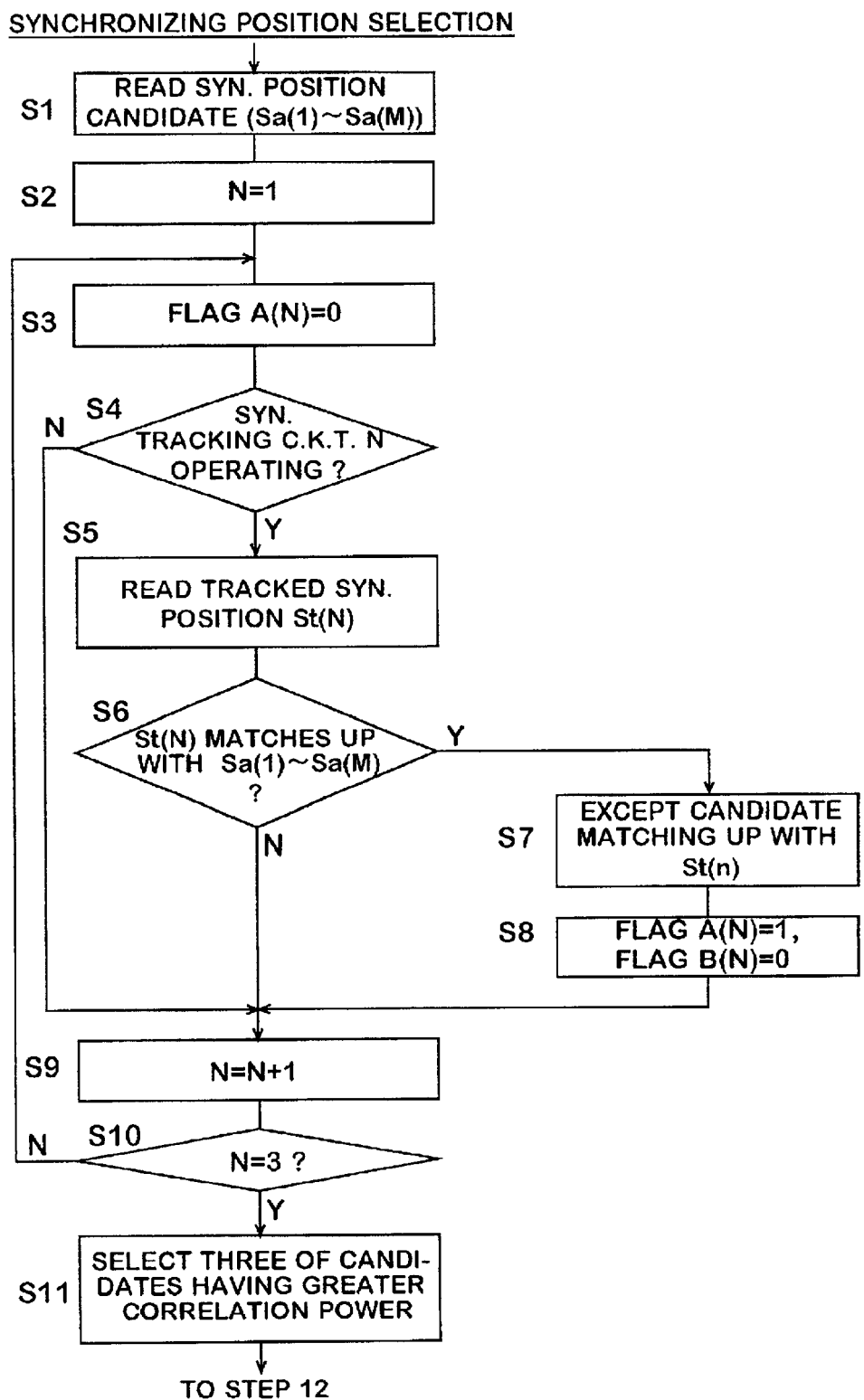
FIG. 10 is a flowchart of a synchronizing position selecting program performed in second embodiment.

FIG. 10 shows a synchronizing position selecting program.

After entering the program, the routine proceeds to step 1 wherein the allocation control circuit 12 reads in the received signal S10A(e.g., the signal as shown in FIG. 9(*b*)), containing the synchronizing position candidates Sa(1) to Sa(M) provided by the correlation determining circuit 11.

The routine proceeds to step 2 wherein the allocation control circuit 12 sets the count value AT of an ID counter installed therein which indicates one of the synchronization tracking circuits Nto one (1) identifying the first synchronization tracking circuit 2.

The routine proceeds to step 3 wherein the allocation control circuit 12 turns off or sets the flag A(1) to 0.

The routine proceeds to step 4 wherein the allocation control circuit 12 determines whether the first synchronization tracking circuit 2 is operating or not. If a YES answer is obtained meaning that the first synchronization tracking circuit 2 is operating, then the routine proceeds to step 5. Alternatively, if a NO answer is obtained, then the routine proceeds directly to step 9.

In step 5, the allocation control circuit 12 reads the tracked synchronizing position St(1)(corresponding to FIG. 9(*b*)) out of the first synchronization tracking circuit 2.

The routine proceeds to step 6 wherein the allocation control circuit 12 determines whether the tracked synchronizing position St(1) matches up with any one of the synchronizing position candidates Sa(1) to Sa(M) or not. If a YES answer is obtained, then the routine proceeds to step 7. Alternatively, if a NO answer is obtained, then the routine proceeds to step 9.

In step 7, one of the synchronizing position candidates matching up with the tracked synchronizing position St(1) is excepted. In the example shown in FIGS. 9(*a*) to 9(*e*), the synchronizing position candidate (2) is excepted.

The routine proceeds to step 8 wherein the flag A(1) and the flag B(1) are set to 1 and 0, respectively.

The routine proceeds to step 9 wherein the allocation control circuit 12 increments the count value AT of the counter to select the second synchronization tracking circuit 3.

The routine proceeds to step 10 wherein it is determined whether the count value JVis three (3) or not. If a NO answer is obtained, then the routine returns back to step 3. Alternatively, if a YES answer is obtained meaning that steps 3 to 8 have been executed on all the synchronization tracking circuits 2 to 4, then the routine proceeds to step 11. By the operations performed so far, the reception responses being tracked in the synchronizing position are all excepted from the synchronizing position candidates.

In step 11, the allocation control circuit 12 selects a maximum of three of the synchronizing position candidates Sa(1) to Sa(M) in order of magnitude of the correlation power as the allocating synchronizing positions. By such a synchronization position selection, for example, at the time of FIG. 9(*b*), the signals (4) and (5) are newly selected that are different from the signal (2) that has already been selected at the time of FIG. 9(*a*); however, in contrast, since the signals (2), (4), and (5) have already been selected at the time of FIG. 9(*b*), no signal is newly selected at the time of FIG. 9(*c*).

Figure 11:
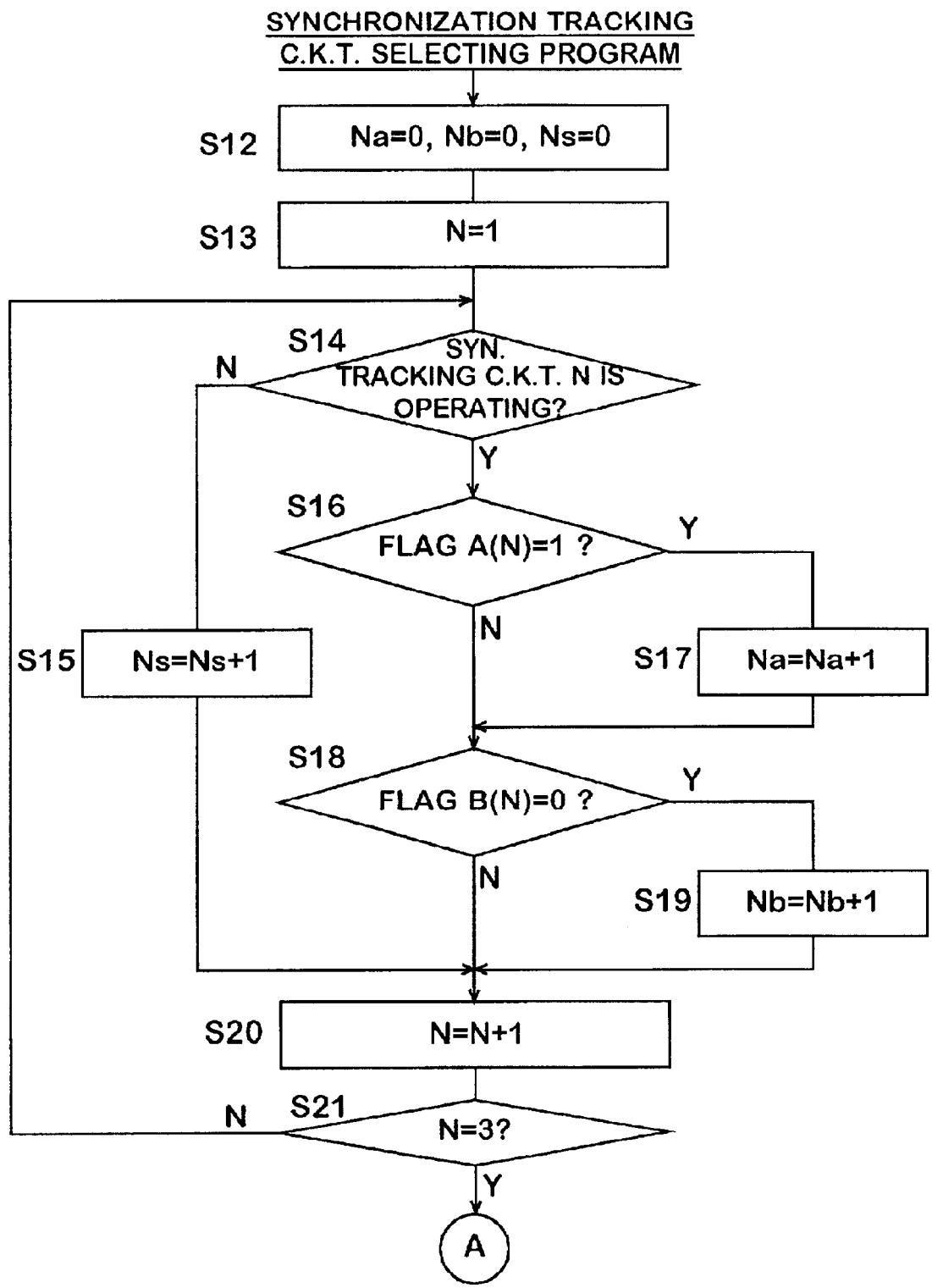
FIGS. 11 and 12 show a flowchart of a synchronization tracking circuit selecting program performed in the second embodiment.
Figure 12:
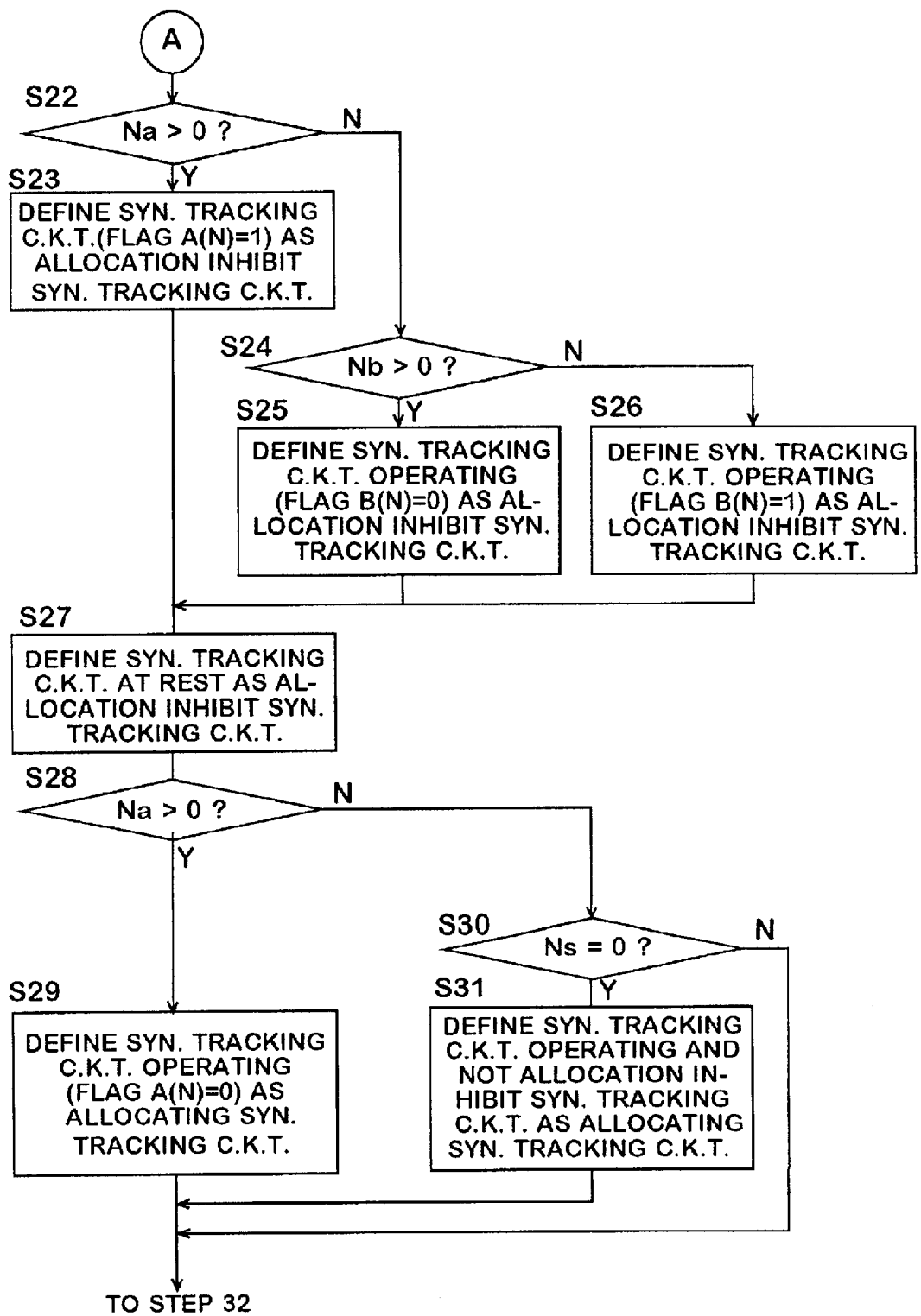

FIGS. 11 and 12 show a synchronization tracking circuit selecting program.

After entering the program, the routine proceeds to step 12 wherein the allocation control circuit 12 resets the count values Na, Nb, and Ns of counters installed therein to zero (0). The count value Na indicates the number of the synchronization tracking circuits AT specified by the flag A(N)=1. The count value Nb indicates the number of the synchronization tracking circuits AT specified by the flag B(N)=0. The count value Ns indicates the number of the synchronization tracking circuits AT which are at rest.

In summary, the count value Na is used to count the number of the tracking circuits that track the signals whose probabilities that the signals are not noises but transmission signals are large while the count Nb is used to count the number of tracking circuits that just commence tracking.

The routine proceeds to step 13 wherein the allocation control circuit 12 sets the count value AT of the ID counter installed therein which indicates one of the synchronization tracking circuits N to one (1) identifying the first synchronization tracking circuit 2.

The routine proceeds to step 14 wherein the allocation control circuit 12 determines whether the first synchronization tracking circuit 2 is operating or not. If a YES answer is obtained meaning that the first synchronization tracking circuit 2 is operating, then the routine proceeds to step 16. Alternatively, if a NO answer is obtained, then the routine proceeds to step 15 wherein the count value Ns is incremented by one (1) and proceeds to step 20.

In step 16, the allocation control circuit 12 determines whether the flag A(1) is one (1) or not. If a YES answer is obtained meaning that the flag A(1)=1, then the routine proceeds to step 17 wherein the count value Na is incremented by one (1) and proceeds to step 18. Alternatively, if a NO answer is obtained, then the routine proceeds to step 18.

In step 18, the allocation control circuit 12 determines whether the flag B(1) is zero (0) or not. If a YES answer is obtained meaning that the flag B(1)=0, then the routine proceeds to step 19 wherein the count value Nb is incremented by one (1) and proceeds to step 20. Alternatively, if a NO answer is obtained, then the routine proceeds to step 20.

In step 20, the count value AT of the ID counter is incremented by one (1) to select the second synchronization tracking circuit 3.

The routine proceeds to step 21 wherein it is determined whether the count value iVis three (3) or not. If a NO answer is obtained, then the routine returns back to step 14. Alternatively, if a YES answer is obtained meaning that steps 14 to 19 have been executed on all the synchronization tracking circuits 2 to 4, then the routine proceeds to step 22 in FIG. 12. By the operations performed so far, the synchronization tracking circuits AT are classified into three groups: one being at rest, the second being specified by the flag A(N)=1, and the third being specified by the flag B(N)=0.

In step 22, the allocation control circuit 12 determines whether the count value Ns is greater than zero (0) or not. If a YES answer is obtained meaning that there is the synchronization tracking circuit(s) AT specified by the flag A(N)=1, then the routine proceeds to step 23. Alternatively, if a NO answer is obtained meaning that there is no synchronization tracking circuit N specified by the flag A(N)=1, then the routine proceeds to step 24.

In step 23, the allocation control circuit 12 defines the synchronization tracking circuit(s) N specified by the flag A(N)=1 as the allocation inhibit synchronization tracking circuit.

In step 24, the allocation control circuit 12 determines whether the count value Nb is greater than zero (0) or not. If a YES answer is obtained meaning that there is the synchronization tracking circuit(s) AT specified by the flag B(N)=0, then the routine proceeds to step 25. Alternatively, if a NO answer is obtained meaning that there is no synchronization tracking circuit N specified by the flag B(N)=0, then the routine proceeds to step 26.

In step 25, the allocation control circuit 12 selects any one of the synchronization tracking circuits AT which are operating and specified by the flag B(N)=0 and defines it as the allocation inhibit synchronization tracking circuit.

In step 26, the allocation control circuit 12 selects any one of the synchronization tracking circuits AT which are operating and specified by the flag B(N)=1, and defines it as the allocation inhibit synchronization tracking circuit.

By the operations performed so far, at least one of the synchronization tracking circuits AT is provided as the allocation inhibit synchronization tracking circuit regardless of the operating conditions of the synchronization tracking circuits N. The provision of the allocation inhibit synchronization tracking circuit avoids undesirable interruption of the demodulating operation even if the synchronizing positions are allocated to the other synchronization tracking circuits N.

After step 23, 25, or 26, the routine proceeds to step 27 wherein the allocation control circuit 12 specifies the synchronization tracking circuit(s) N which is at rest as an allocating synchronization tracking circuit.

The routine proceeds to step 28 wherein the allocation control circuit 12 determines whether the count value Ns is greater than zero (0) or not. If a YES answer is obtained meaning that there is at least one of the synchronization tracking circuits AT which is specified by the flag A(N)=1, then the routine proceeds to step 29. Alternatively, if a NO answer is obtained meaning that there is no synchronization tracking circuit AT specified by the flag A(N)=1, then the routine proceeds to step 30.

In step 29, the allocation control circuit 12 defines the synchronization tracking circuit(s) AT which is operating and specified by the flag A(N)=0 as the allocating synchronization tracking circuit. If there is at least one of the synchronization tracking circuits N which is specified by the flag A(N)=1, the selected synchronizing position candidate may be viewed as a synchronizing position associated with an effective path. The synchronization tracking circuit N specified by the flag A(N)=1 is specified as the allocation inhibit synchronization tracking circuit to which the synchronizing position is inhibited from being allocated. The synchronization tracking circuits N specified by the flag A(N)=0 may be considered as tracking an ineffective synchronizing position or a synchronizing position of a fixed power not exceeding a threshold value during the correlation determining operation and thus determined as the allocating synchronization tracking circuits to which new synchronizing positions are to be allocated. Since at least one of the synchronization tracking circuits N which is specified by the flag A(N)=1 is selected in step 23 as the allocation inhibit synchronization tracking circuit, the allocation of synchronizing positions to the other synchronization tracking circuit jVwill not cause the demodulating operation to be interrupted, thereby enabling each of the synchronization tracking circuits AT to track an effective synchronizing position, thus keeping the effects of the pass diversity.

In summary, in the example of FIG. 9, even after the intermittent transmission at the time of FIG. 9(*d*), the signal (2) at the time of FIG. 9(*e*) continues being tracked. Therefore, even though any signals or noises other than the signal (2) are newly acquired at the time of FIG. 9(*e*), or even though it takes much time to complete acquiring or tracking at that time, the receiver at the time of FIG. 9(*e*) can demodulate based upon the signal (2) that has been being tracked.

In step 30, the allocation control circuit 12 determines whether the count value Ns is zero (0) or not. If a YES answer is obtained meaning that there is no synchronization tracking circuit AT which is specified by the flag A(N)=1 and at rest, then the routine proceeds to step 31. Alternatively, if a NO answer is obtained meaning that there is no synchronization tracking circuit AT specified by the flag A(N)=1, and there is the S3aichronization tracking circuit AT which is at rest, then the routine proceeds to a synchronizing position allocating program, as discussed later.

In step 31, the allocation control circuit 12 selects any one of the synchronization tracking circuits AT which are operating and not specified as the allocation inhibit synchronization tracking circuits and defines it as the allocating synchronization tracking circuit. When there is no synchronization tracking circuit AT specified by the flag A(N)–1, but there is the synchronization tracking circuit N specified by the flag B(N)=0, it may be the case where a mobile station is at rest or the synchronization tracking circuits AT are not tracking effective phases. In this case, one of the synchronization tracking circuits AT specified by the flag B(N)–0 is specified in step 25 as the allocation inhibit synchronization tracking circuit.

If the mobile station is, now stopping transmitting a signal, there is a high likelihood that the synchronization tracking circuits N specified by the flag B(N)=0 are tracking effective synchronizing positions. From these circuits, the allocation inhibit synchronization tracking circuit is selected. Therefore, even if synchronizing positions are allocated to the other synchronization tracking circuits, the demodulating operation is not interrupted, so that the effects of the pass diversity are assured.

Additionally, even if the synchronization tracking circuits AT specified by the flag B(N)=0 are not tracking effective phases, the selection of the allocation inhibit synchronization tracking circuit in step 25 prevents the demodulating operation from being interrupted regardless of allocation of synchronizing positions to the other synchronization tracking circuits 1 thus keeping the demodulating operation in a good condition.

Further, when there is no synchronization tracking circuit N specified by the flag A1)=1, and there is no synchronization tracking circuit N specified by the flag B1=0, one of the synchronization tracking circuits N specified by the flag B(N)=1 is specified in step 26 as the allocation inhibit synchronization tracking circuit, and a selected synchronizing position is allocated to one of the synchronization tracking circuits N, thereby enabling the demodulating operation to be performed effectively without being interrupted. In summary, when the intermittent transmission is carried out, that is, when all the probabilities that the tracked signals are not noises but transmission signals are small and also all the tracking of those signals just commence, the tracking of a signal among those signals is continued.

Figure 13:
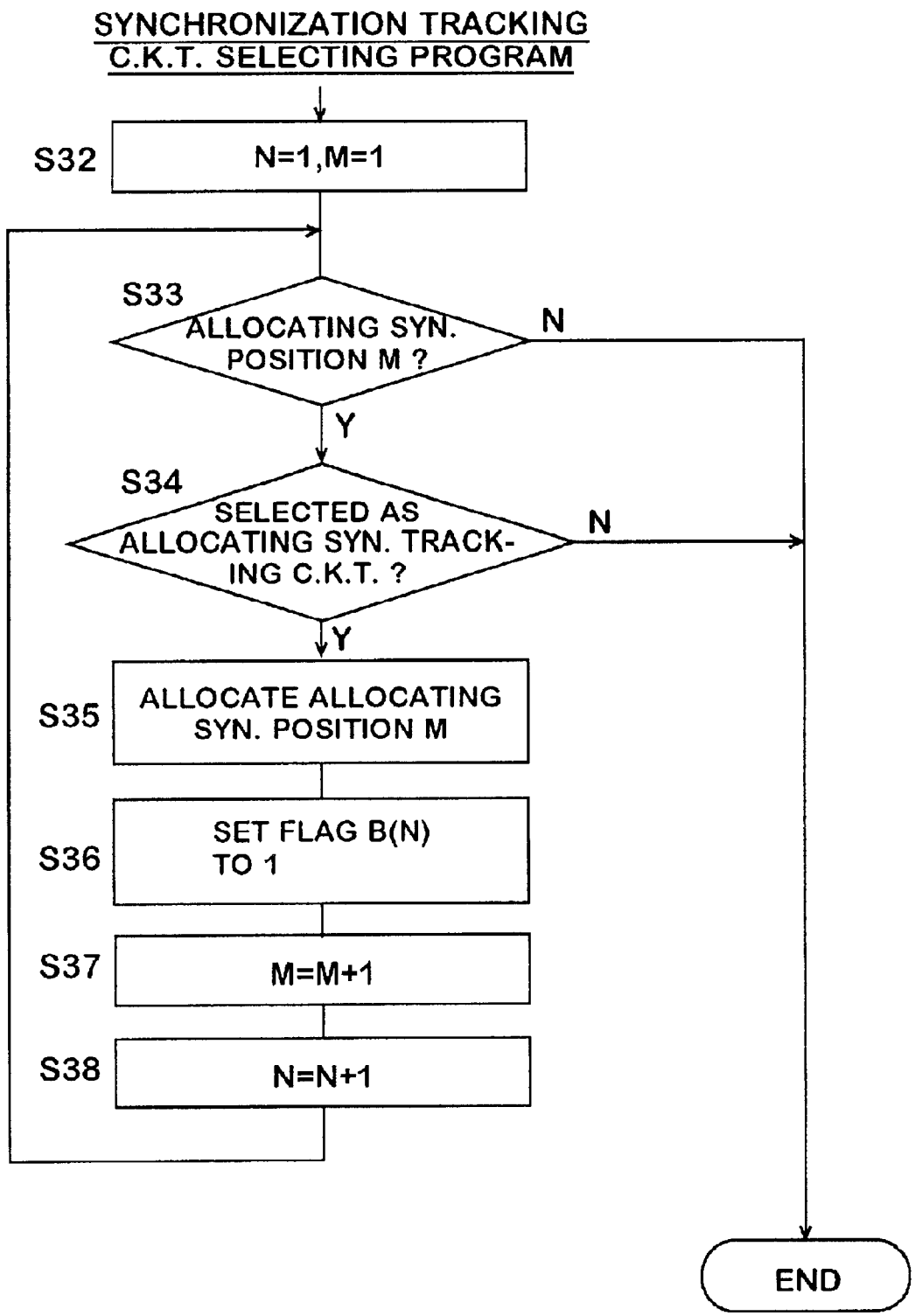
FIG. 13 is a flowchart of a synchronizing position allocating program performed in the second embodiment.

After step 29 or 31, the synchronizing position allocating program, as shown in FIG. 13, is initiated.

First, in step 32, the allocation control circuit 12 sets the count value N of the ID counter which indicates one of the synchronization tracking circuits JVto one (1) which indicates the first synchronization tracking circuit 2 and also sets the count value M of an allocating synchronizing position ID counter installed therein which indicates the allocating synchronizing position Mto one (1). The allocating synchronization position M indicates one of the synchronizing position candidates selected in step 11. Specifically, Mis one of 1, 2, and 3. M=1 indicates the synchronizing position candidate showing the smallest delay time of the synchronizing position, while M-3 indicates the synchronizing position candidate showing the greatest delay time of the synchronization position.

The routine proceeds to step 33 wherein the allocation control circuit 12 determines whether there is the allocating synchronizing position M=1 or not. If a NO answer is obtained, then the routine terminates. Alternatively, if a YES answer is obtained, then the routine proceeds to step 34 wherein the synchronization tracking circuit 2 specified by the count value N=1 has been selected as the allocating synchronization tracking circuit in the synchronization tracking circuit selecting program of FIG. 12 or not. If a NO answer is obtained, then the routine terminates. Alternatively, if a YES answer is obtained, then the routine proceeds to step 35.

In step 35, the allocation control circuit 12 allocates the allocating synchronizing position M=1 to the synchronization tracking circuit 2.

The routine proceeds to step 36 wherein the allocation control circuit 12 sets the flag B(N) to one (1).

The routine proceeds to step 37 wherein the count value Misincremented by one (1).

The routine proceeds to step 38 wherein the count value Nis incremented by one (1) and returns to step 33.

The second embodiment, as described above, includes the three synchronization tracking circuits 2 to 4, but more than three synchronization tracking circuits may be used depending upon specifications of a communication system with which the synchronization acquiring apparatus is employed.

The synchronization acquiring apparatus of the second embodiment, as apparent from the above discussion, works to prevent a receiving station from determining during the rest of a transmission station in the intermittent transmission operation that a path has disappeared and allocating a new synchronizing position to one of synchronization tracing circuits which has tracked an effective synchronizing position immediately before.

In summary, even though the signals (2), (4), and (5) temporarily stop, that is, the flags A of the signal (2), (4), and (5) are set to flag-off at the time of FIG. 9(d), tracking the signal (2) is continued at the time of FIG. 9(e) on the basis of the flag B of the signal (2) that denotes the tracking the signal (2) does not just commence. As a result, at the time of FIG. 9(e), even though any signal or noise is acquired or it takes much time to complete acquiring or tracking, modulation can be successfully made based upon the signal (2) that has been being tracked.

<Third Embodiment>

The acquiring apparatus of the second embodiment, when there are a plurality of signals that can be used to continue tracking, allows an arbitrary signal among those signals to continue being tracked. In contrast, the acquiring apparatus of the third embodiment allows a signal whose power is larger to continue being tracked.

Figure 14:
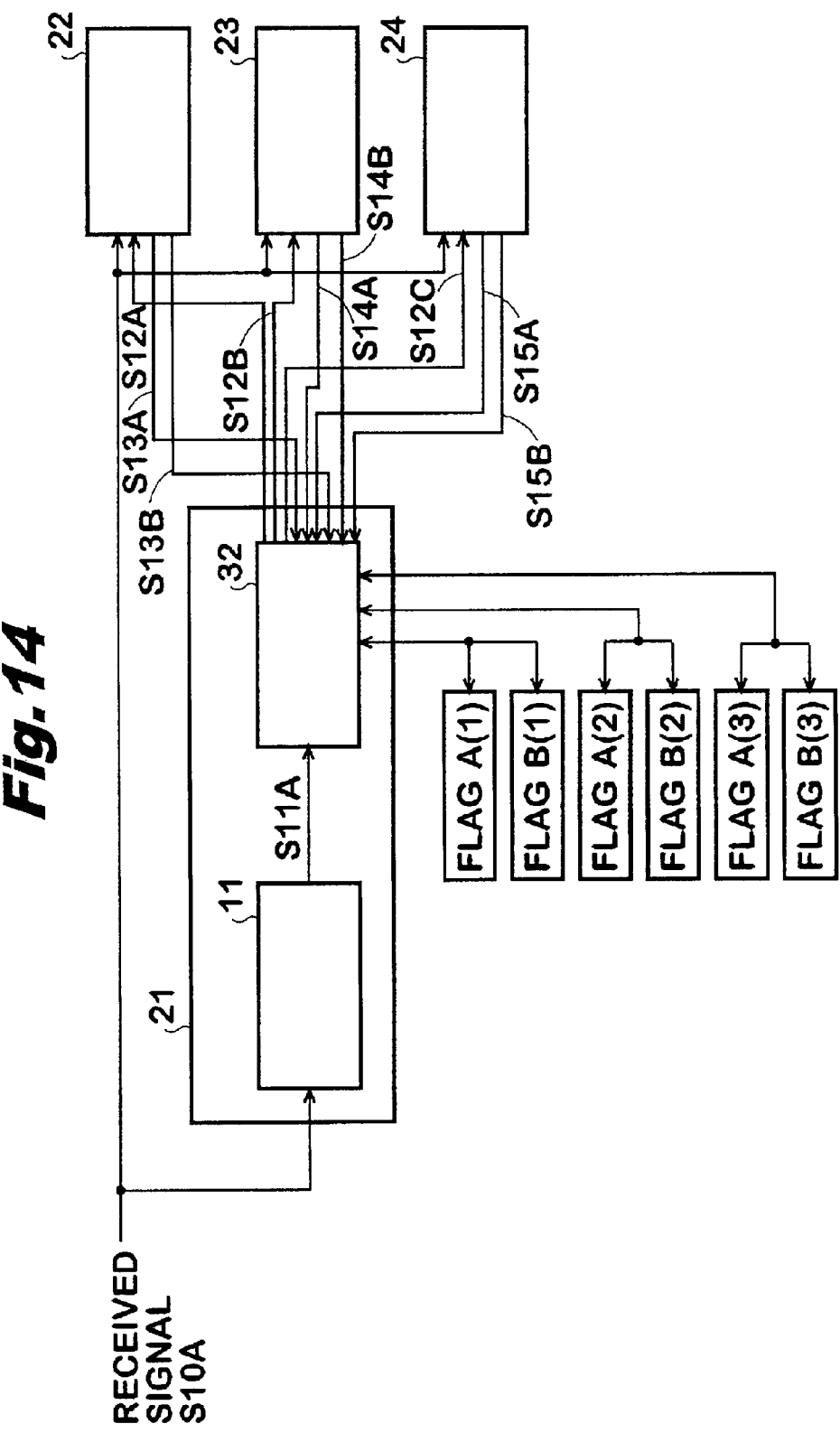
FIG. 14 is a block diagram which shows a synchronization acquiring apparatus according to a third embodiment of the invention.

FIG. 14 shows a synchronization acquiring apparatus according to the third embodiment of the invention.

The synchronization acquiring apparatus includes generally a synchronization acquiring circuit 21, a first synchronization tracking circuit 22, a second synchronization tracking circuit 23, and a third synchronization tracking circuit 24.

The synchronization acquiring circuit 21 includes a correlation determining circuit 11 and an allocation control circuit 32 and is designed to provide flags A(1), B(1), A(2), B(2), A(3), and B(3).

Only differences between the first and third embodiments will be discussed below.

The allocation control circuit 32 receives the synchronizing position signal S11A from the correlation determining circuit 11, a tracked synchronizing position S13A and a tracked correlation power signal S13B from a first synchronization tracking circuit 22, a tracked synchronizing position signal S14A and a tracked correlation power signal S14B from a second synchronization tracking circuit 23, and a tracked synchronizing position signal S15A and a tracked correlation power signal S15B from a third synchronization tracking circuit 24. The allocation control circuit 32 also provides allocating synchronizing position signals S12A, S12B, and S12C to the first, second, and third synchronization tracking circuits 22, 23, and 24, respectively.

The tracked correlation power signal S13B is a signal indicating the level of a reception signal (i.e., a tracked correlation power $Pt(N)$) tracked in synchronization received by the first synchronization tracking circuit 22. The tracked correlation power signal S14B is a signal indicating the level of a reception signal (i.e., the tracked correlation power $Pt(N)$) tracked in synchronization received by the second synchronization tracking circuit 23. The tracked correlation power signal S15B is a signal indicating the level of a reception signal (i.e., the tracked correlation power $Pt(N)$) tracked in synchronization received by the third synchronization tracking circuit 24.

The first synchronization tracking circuit 22 receives the received signal S10A and the allocating synchronizing position signal S12A to perform the synchronization tracking operation and outputs the tracked synchronizing position signal S13A and the tracked correlation power signal 13B. The second synchronization tracking circuit 23 receives the received signal S10A and the allocating synchronizing position signal S12B to perform the synchronization tracking operation and outputs the tracked synchronizing position signal S14A and the tracked correlation power signal 14B. The third synchronization tracking circuit 24 receives the received signal S10A and the allocating synchronizing position signal S12C to perform the synchronization tracking operation and outputs the tracked synchronizing position signal S15A and the tracked correlation power signal 15B.

The operations of the synchronization acquiring apparatus of the third embodiment will be discussed below in detail.

1 Synchronizing Position Selection

This operation is performed by the allocation control circuit 32 to receive a signal (e.g., the received signal in FIG. 9(b)) containing a plurality of reception responses (i.e., the synchronizing position candidates) from the correlation determining circuit 11 to select three of the reception responses in the order of magnitude of correlation power. The reception response being tracked effectively is, however, excepted. The selected reception responses, like the second embodiment, will be defined as an allocating synchronizing position.

2 Synchronization Tracking Circuit Selection

This operation is to allocate the allocating synchronizing positions selected by the synchronizing position selecting operation, as discussed above, to select the synchronization tracking circuit for tracking the synchronization. Therefore, the synchronization tracking circuit which is now tracking the effective synchronization is excepted from the selection. The synchronization tracking circuit excepted by this operation, like the second embodiment, will be referred to below as an allocation inhibit synchronization tracking circuit.

3 Synchronizing Position Allocation

This operation is to allocate the allocating synchronizing positions to the synchronization tracking circuits other than the allocation inhibit synchronization circuit.

The above operations will be described below with reference to flowcharts as shown in FIGS. 15 to 18.

Figure 15:
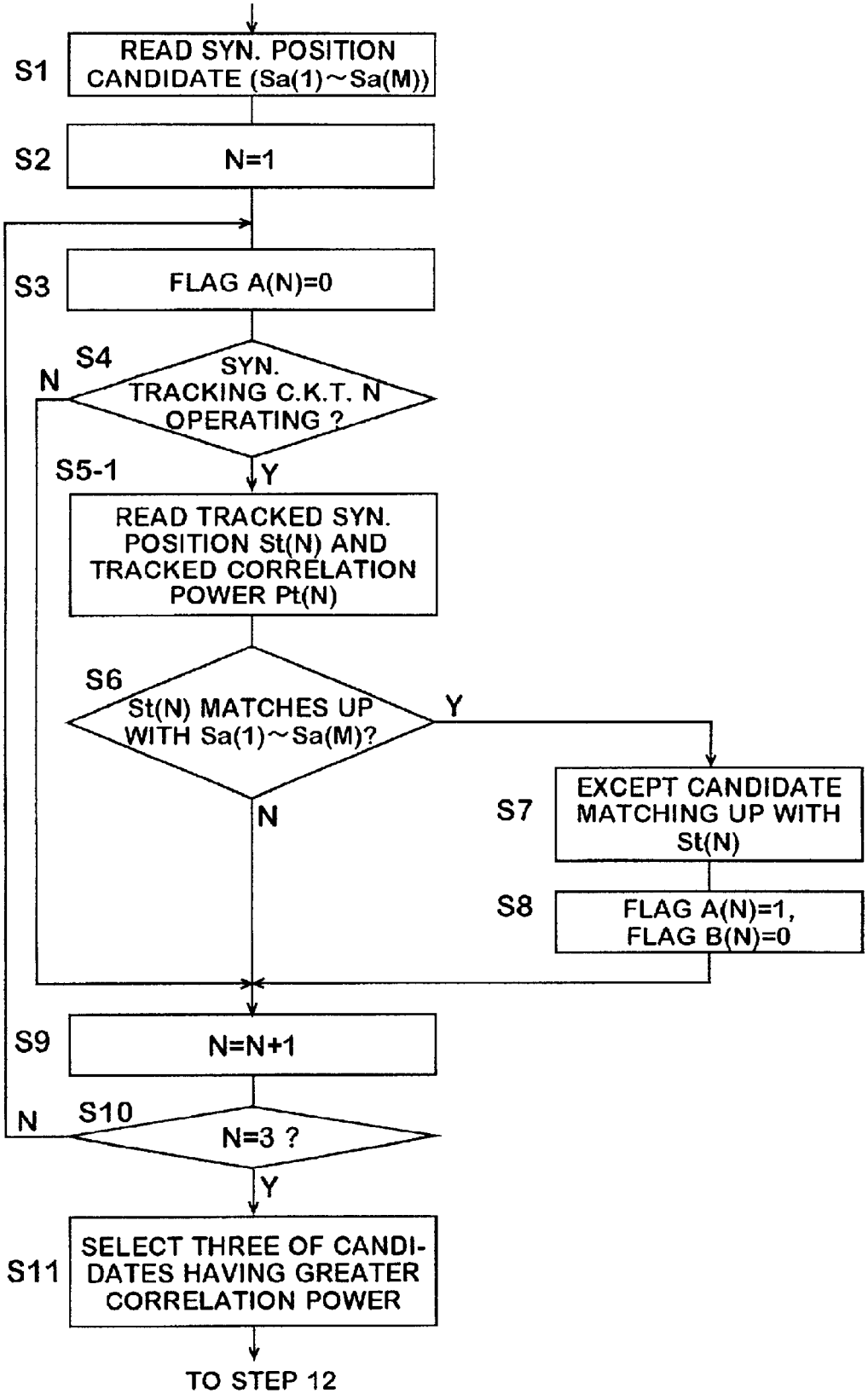
FIG. 15 is a flowchart of a synchronizing position selecting program performed in the third embodiment.

FIG. 15 shows a synchronizing position selecting program performed by the synchronization acquiring apparatus of the third embodiment.

After entering the program, the routine proceeds to step 1 wherein the allocation control circuit 32 reads the received signal S10A (e.g., the signal as shown in FIG. 9(b)), containing the synchronizing position candidates Sa(1) to Sa(M) out of the correlation determining circuit 11.

The routine proceeds to step 2 wherein the allocation control circuit 32 sets the count value Nof an ID counter installed therein which indicates one of the synchronization tracking circuits Nto one (1) identifying the first synchronization tracking circuit 22.

The routine proceeds to step 3 wherein the allocation control circuit 32 turns off or sets the flag A(1) to 0.

The routine proceeds to step 4 wherein the allocation control circuit 32 determines whether the first synchronization tracking circuit 22 is operating or not. If a YES answer is obtained meaning that the first synchronization tracking circuit 22 is operating, then the routine proceeds to step 5-1. Alternatively, if a NO answer is obtained, then the routine proceeds directly to step 9.

In step 5-1, the allocation control circuit 32 reads the tracked synchronizing position St(1)(corresponding to FIG. 9(b)) and the tracked correlation power Pt(N) out of the first synchronization tracking circuit 22.

The routine proceeds to step 6 wherein the allocation control circuit 32 determines whether the tracked synchronizing position St(1) matches up with any one of the synchronizing position candidates Sa(1) to Sa(M) or not. If a YES answer is obtained, then the routine proceeds to step 7. Alternatively, if a NO answer is obtained, then the routine proceeds to step 9.

In step 7, one of the synchronizing position candidates matching up with the tracked synchronizing position St(1) is excepted. In the example shown in FIGS. 9(a) to 9(e), the synchronizing position candidate (2) is excepted.

The routine proceeds to step 8 wherein the flag A(1) and the flag B(1) are set to 1 and 0, respectively.

The routine proceeds to step 9 wherein the allocation control circuit 32 increments the count value AT of the counter by one (1) to select the second synchronization tracking circuit 23.

The routine proceeds to step 10 wherein it is determined whether the count value Nis three (3) or not. If a NO answer is obtained, then the routine returns back to step 3. Alternatively, if a YES answer is obtained meaning that steps 3 to 8 have been executed on all the synchronization tracking circuits 22 to 24, then the routine proceeds to step 11. By the operations performed so far, the reception responses being tracked in the synchronizing position are all excepted from the synchronizing position candidates.

In step 11, the allocation control circuit 32 selects a maximum of three of the synchronizing position candidates Sa(1) to Sa(M) in order of magnitude of the correlation power as the allocating synchronizing positions.

Figure 16:
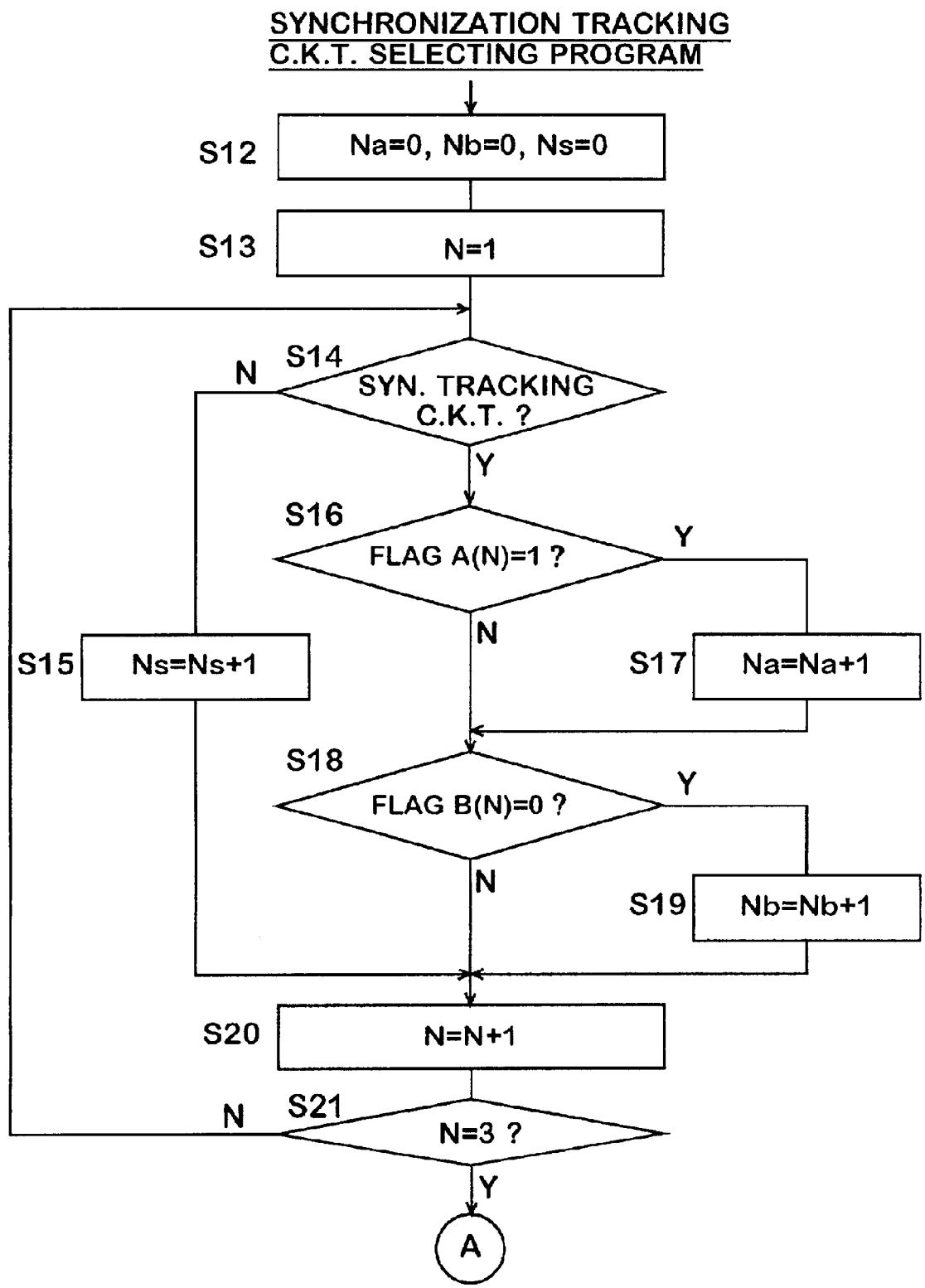
FIGS. 16 and 17 show a flowchart of a synchronization tracking circuit selecting program performed in the third embodiment.
Figure 17:
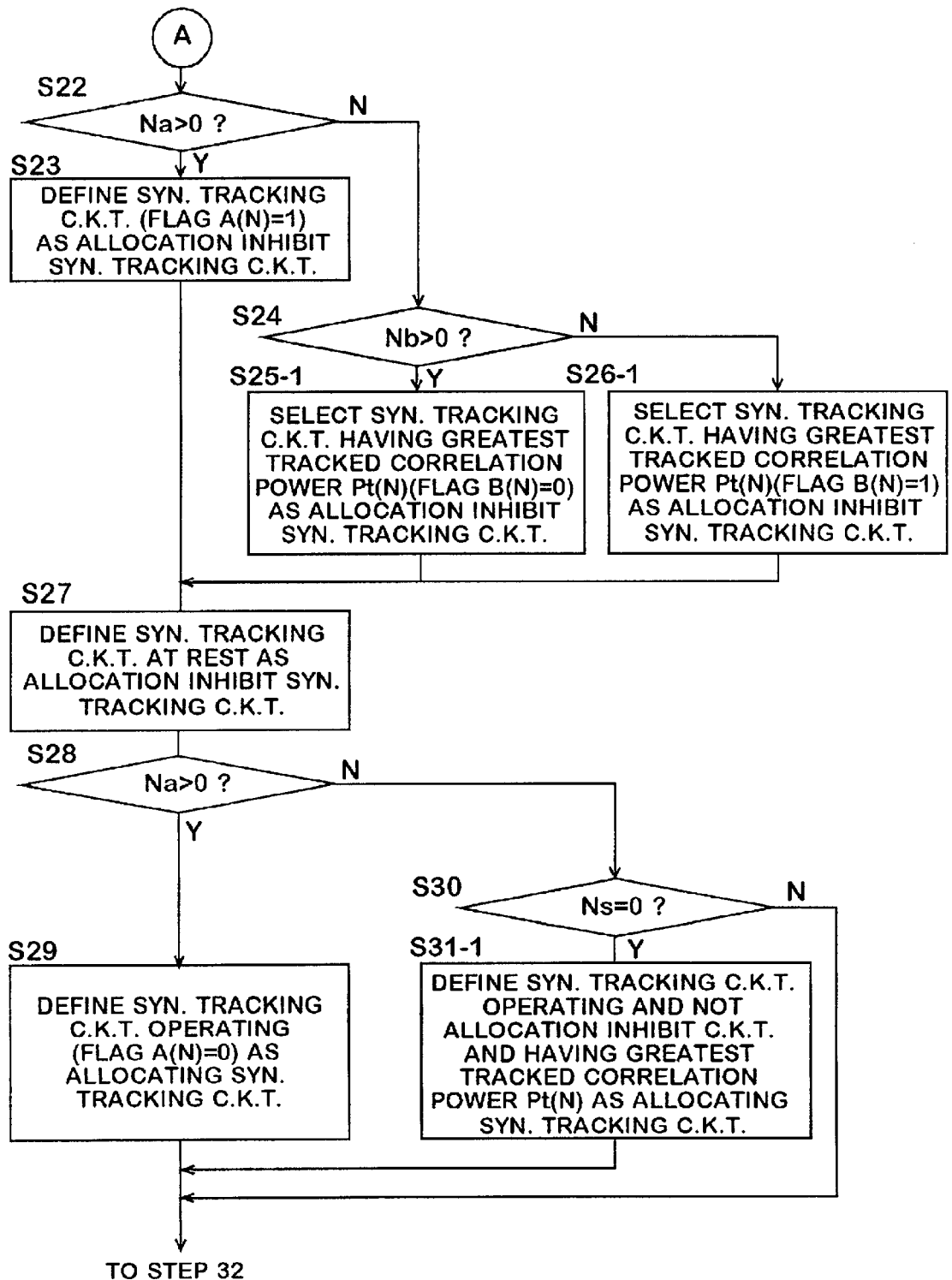

FIGS. 16 and 17 show a synchronization tracking circuit selecting program.

After entering the program, the routine proceeds to step 12 wherein the allocation control circuit 32 resets the count values Na, Nb, and Ns of counters installed therein to zero (0). The count value Na indicates the number of the synchronization tracking circuits N specified by the flag A(N)=1. The count value Nb indicates the number of the synchronization tracking circuits N specified by the flag B(N)=0. The count value Ns indicates the number of the synchronization tracking circuits N which are at rest.

The routine proceeds to step 13 wherein the allocation control circuit 32 sets the count value AT of the ID counter installed therein which indicates one of the synchronization tracking circuits TV to one (1) identifying the first synchronization tracking circuit 22.

The routine proceeds to step 14 wherein the allocation control circuit 32 determines whether the first synchronization tracking circuit 22 is operating or not. If a YES answer is obtained meaning that the first synchronization tracking circuit 22 is operating, then the routine proceeds to step 16. Alternatively, if a NO answer is obtained, then the routine proceeds to step 15 wherein the count value Ns is incremented by one (1) and proceeds to step 20.

In step 16, the allocation control circuit 32 determines whether the flag A(1) is one (1) or not. If a YES answer is obtained meaning that the flag A(1)=1, then the routine proceeds to step 17 wherein the count value Na is incremented by one (1) and proceeds to step 18. Alternatively, if a NO answer is obtained, then the routine proceeds to step 18.

In step 18, the allocation control circuit 32 determines whether the flag B(1) is zero (0) or not. If a YES answer is obtained meaning that the flag B(1)=0, then the routine proceeds to step 19 wherein the count value Nb is incremented by one (1) and proceeds to step 20. Alternatively, if a NO answer is obtained, then the routine proceeds to step 20.

In step 20, the count value AT of the ID counter is incremented by one (1) to select the second synchronization tracking circuit 23.

The routine proceeds to step 21 wherein it is determined whether the count value Nis three (3) or not. If a NO answer is obtained, then the routine returns back to step 14. Alternatively, if a YES answer is obtained meaning that steps 14 to 19 have been executed on all the synchronization tracking circuits 22 to 24, then the routine proceeds to step 22 in FIG. 17. By the operations performed so far, the synchronization tracking circuits AT are classified into three groups: one being at rest, the second being specified by the flag A(N)=1, and the third being specified by the flag B(N)=0.

In step 22, the allocation control circuit 32 determines whether the count value Ns is greater than zero (0) or not. If a YES answer is obtained meaning that there is the synchronization tracking circuit(s) AT specified by the flag A(N)=1, then the routine proceeds to step 23. Alternatively, if a NO answer is obtained meaning that there is no synchronization tracking circuit N specified by the flag A(N)=1, then the routine proceeds to step 24.

In step 23, the allocation control circuit 32 defines the synchronization tracking circuit(s) N specified by the flag A(N)=1 as the allocation inhibit S}aachronization tracking circuit.

In step 24, the allocation control circuit 32 determines whether the count value Nb is greater than zero (0) or not. If a YES answer is obtained meaning that there is the synchronization tracking circuit(s) AT specified by the flag B(N)=0, then the routine proceeds to step 25-1. Alternatively, if a NO answer is obtained meaning that there is no synchronization tracking circuit N specified by the flag B(N)=0, then the routine proceeds to step 26-1.

In step 25-1, the allocation control circuit 32 selects from the synchronization tracking circuits N which are operating and specified by the flag B(N)=0 one showing the greatest tracked correlation power Pt(N) and defines it as the allocation inhibit synchronization tracking circuit.

In summary, tracking the signal whose tracked correlation power Pt is the largest is continued.

In step 26-1, the allocation control circuit 32 selects from the synchronization tracking circuits N which are operating and specified by the flag B(N)=1 one showing the greatest tracked correlation power Pt(N), and defines it as the allocation inhibit synchronization tracking circuit.

In summary, tracking the signal whose tracked correlation power Pt is the largest is continued.

By the operations performed so far, at least one of the synchronization tracking circuits AT is provided as the allocation inhibit synchronization tracking circuit regardless of the operating conditions of the synchronization tracking circuits N. The provision of the allocation inhibit synchronization tracking circuit avoids undesirable interruption of the demodulating operation even if the synchronizing positions are allocated to the other synchronization tracking circuits N.

After step 23, 25-1, or 26-1, the routine proceeds to step 27 wherein the allocation control circuit 32 specifies the synchronization tracking circuit(s) N which is at rest as the allocating synchronization tracking circuit.

The routine proceeds to step 28 wherein the allocation control circuit 32 determines whether the count value Ns is greater than zero (0) or not. If a YES answer is obtained meaning that there is at least one of the synchronization tracking circuits AT which is specified by the flag A(N)=1, then the routine proceeds to step 29. Alternatively, if a NO answer is obtained meaning that there is no synchronization tracking circuit AT specified by the flag A(N)=1, then the routine proceeds to step 30.

In step 29, the allocation control circuit 32 defines the synchronization tracking circuit(s) N which is operating and specified by the flag A(N)=0 as the allocating synchronization tracking circuit. If there is at least one of the synchronization tracking circuits N which is specified by the flag A(N)=1, the selected synchronizing position candidate may be viewed as a synchronizing position associated with an effective path. The synchronization tracking circuit AT specified by the flag A(N)=1 is specified as the allocation inhibit synchronization tracking circuit to which the synchronizing position is inhibited from being allocated. The synchronization tracking circuits N specified by the flag A(N)=0 may be considered as tracking an ineffective synchronizing position or a synchronizing position of a fixed power not exceeding a threshold value during the correlation determining operation and thus determined as the allocating synchronization tracking circuits to which new synchronizing positions are to be allocated. Since at least one of the synchronization tracking circuits AT which is specified by the flag A(N)=1 is selected in step 23 as the allocation inhibit synchronization tracking circuit, the allocation of synchronizing positions to the other synchronization tracking circuit N will not cause the demodulating operation to be interrupted, thereby enabling each of the synchronization tracking circuits AT to track an effective synchronizing position, thus keeping the effects of the pass diversity.

In step 30, the allocation control circuit 32 determines whether the count value Ns is zero (0) or not. If a YES answer is obtained meaning that there is no synchronization tracking circuit N which is specified by the flag A(N)=1 and at rest, then the routine proceeds to step 31-1. Alternatively, if a NO answer is obtained meaning that there is no synchronization tracking circuit AT specified by the flag A(N)=1, and there is the synchronization tracking circuit AT which is at rest, then the routine proceeds to a synchronizing position allocating program, as discussed later.

In step 31-1, the allocation control circuit 32 selects from the synchronization tracking circuits N which are operating and not specified as the allocation inhibit synchronization tracking circuits one showing the smallest tracked correlation power Pt(N) and defines it as the allocating synchronization tracking circuit.

In summary, in lieu of tracking the signal whose tracked correlation power is the smallest, tracking a new signal is commenced.

When there is no synchronization tracking circuit AT specified by the flag A(N)=1, but there is the synchronization tracking circuit AT specified by the flag B(N)=0, it may be the case where a mobile station is at rest or the synchronization tracking circuits AT are not tracking effective phases. In this case, one of the synchronization tracking circuits AT specified by the flag B(N)=0 is specified in step 25-1 as the allocation inhibit synchronization tracking circuit.

If the mobile station is now stopping transmitting a signal, there is a high likelihood that the synchronization tracking circuits AT specified by the flag B(N)=0 are tracking effective synchronizing positions. From these circuits, the allocation inhibit synchronization tracking circuit is selected. Therefore, even if synchronizing positions are allocated to the other synchronization tracking circuits, the demodulating operation is not interrupted, so that the effects of the pass diversity is assured.

Additionally, even if the synchronization tracking circuits N specified by the flag B(N)=0 are not tracking effective phases, the selection of the allocation inhibit synchronization tracking circuit in step 25 prevents the demodulating operation from being interrupted regardless of allocation of synchronizing positions to the other synchronization tracking circuits N, thus keeping the demodulating operation in a good condition.

Further, when there is no synchronization tracking circuit N specified by the flag A(N)=1, and there is no synchronization tracking circuit N specified by the flag B(N)=0, one of the synchronization tracking circuits N specified by the flag B(N)=1 is specified in step 26-1 as the allocation inhibit synchronization tracking circuit, and a selected synchronizing position is allocated to one of the synchronization tracking circuits N, thereby enabling the demodulating operation to be performed effectively without being interrupted.

Figure 18:
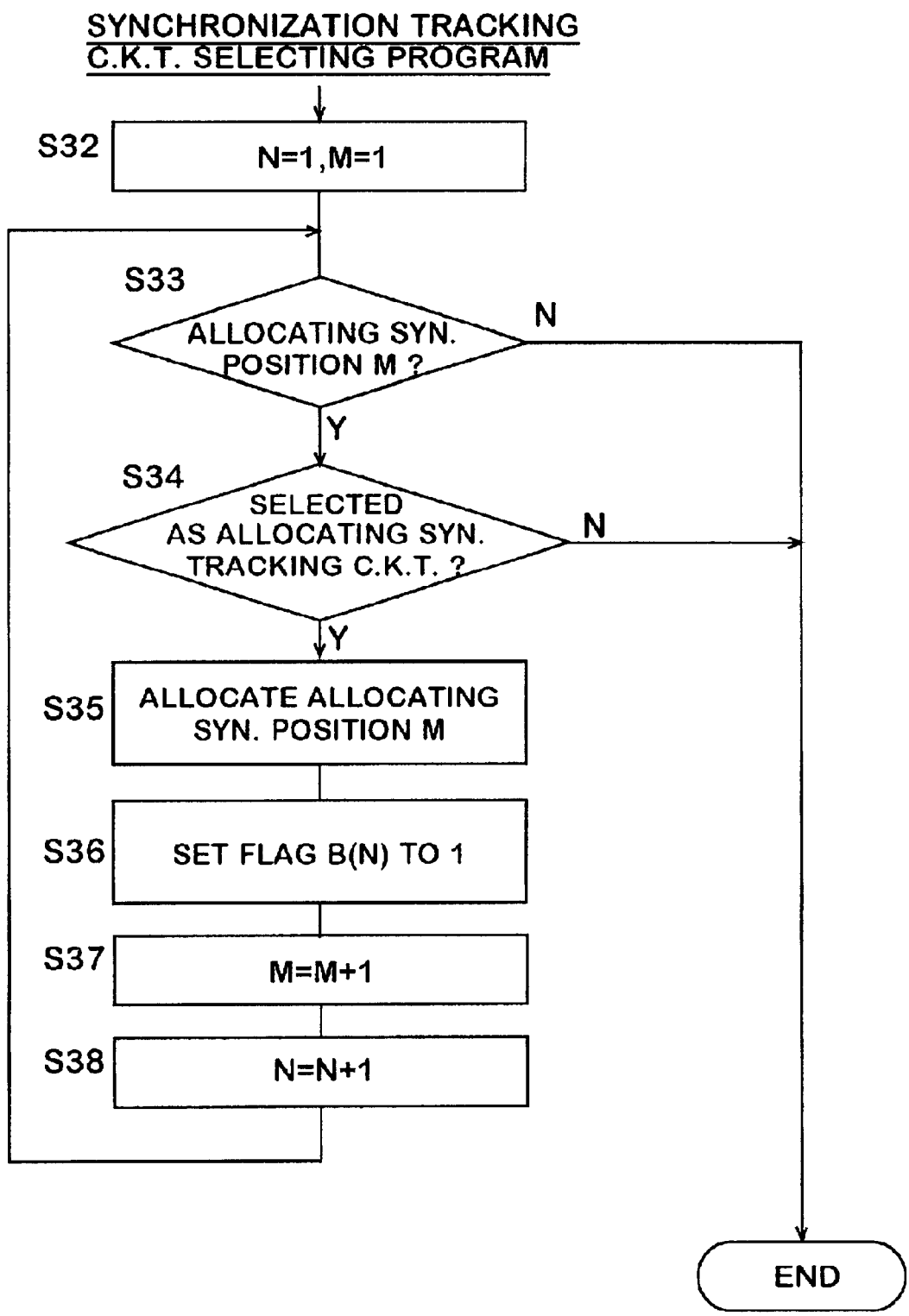
FIG. 18 is a flowchart of a synchronizing position allocating program performed in the third embodiment.

After step 29 or 31-1, the synchronizing position allocating program, as shown in FIG. 18, is initiated.

First, in step 32, the allocation control circuit 32 sets the count value AT of the ID counter which indicates one of the synchronization tracking circuits AT to one (1) identifying the first synchronization tracking circuit 22 and also sets the count value Mof an allocating synchronizing position ID counter installed therein which indicates the allocating synchronizing position Mto one (1). The allocating synchronization position M indicates one of the synchronizing position candidates selected in step 11. Specifically, M is one of 1, 2, and 3. M−1 indicates the synchronizing position candidate showing the smallest delay time of the synchronizing position, while M=3 indicates the synchronizing position candidate showing the greatest delay time of the synchronization position.

The routine proceeds to step 33 wherein the allocation control circuit 32 determines whether there is the allocating synchronizing position M=1 or not. If a NO answer is obtained, then the routine terminates. Alternatively, if a YES answer is obtained, then the routine proceeds to step 34 wherein the synchronization tracking circuit 22 specified by the count value N=1 has been selected as the allocating synchronization tracking circuit in the synchronization tracking circuit selecting program or not. If a NO answer is obtained, then the routine terminates. Alternatively, if a YES answer is obtained, then the routine proceeds to step 35.

In step 35, the allocation control circuit 32 allocates the allocating synchronizing position M=1 to the synchronization tracking circuit 22.

The routine proceeds to step 36 wherein the allocation control circuit 32 sets the flag B(N) to one (1).

The routine proceeds to step 37 wherein the count value M is incremented by one (1).

The routine proceeds to step 38 wherein the count value AT is incremented by one (1) and returns to step 33.

The third embodiment, as described above, includes the three synchronization tracking circuits 22 to 24, but more than three synchronization tracking circuits may be used depending upon specifications of a communication S3^stem with which the synchronization acquiring apparatus is employed.

In summary, in accordance with the acquiring apparatus of the third embodiment, when all the probabilities that the tracked signals are not noises but transmission signals are small and all the tracking of those signals are not just commenced, tracking a signal whose power is the largest among those signals that are capable of being used to continue tracking, is allowed. Alternatively, when all the probabilities that the tracked signal are not noises but transmission signal are small and all the tracking of those signals are just commenced, tracking a signal whose power is the largest among those signals that might be capable of being used to continue tracking is allowed. This enables rendering the S/N ratio better in comparison with the acquiring apparatus of the second embodiment, which can implement a modulation better than that of the acquiring apparatus of the second embodiment.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A receiver for a spread spectrum communication system comprising:
    an acquiring circuit that periodically acquires in synchronization a plurality of signals received via a plurality of different paths from a transmitter;
    a plurality of tracking circuits that respectively track in synchronization a predetermined number of signals from among the plurality of signals acquired by the acquiring circuit;
    a judging circuit that judges whether present propagation conditions and past propagation conditions of the predetermined signals tracked by the plurality of tracking circuits are good or bad; and
    a selecting circuit that selects the predetermined number of signals from the plurality of signals acquired by the acquiring circuit, based upon the present propagation condition and the past propagation condition of the signals judged by the judging circuit, to allow the plurality of tracking circuits to track the predetermined number of signals selected by the selecting circuit.

2. A receiver as set forth in claim 1, wherein when a signal tracked by a tracking circuit at a previous cycle coincides with a signal acquired by the acquiring circuit at a present cycle, the judging circuit judges that the present propagation condition of a signal tracked by the tracking circuit is good.

3. A receiver as set forth in claim 1, wherein when a signal tracked by a tracking circuit at a present cycle was acquired by the acquiring circuit a plurality of times at cycles prior to the present cycle, the judging circuit judges that the past propagation condition of the signal tracked by the tracking circuit was good.

4. A receiver as set forth in claim 1, wherein when the predetermined number of signals tracked by the plurality of tracking circuits at a previous cycle each do not coincide with any of the plurality of signals acquired by the acquiring circuit at a present cycle, the selecting circuit allows at least one of the plurality of tracking circuits to continue tracking at the present cycle one of the predetermined number of signals that the one of the plurality of tracking circuits tracked at the previous cycle, based upon the past propagation condition of the predetermined number of signals.

5. A receiver as set forth in claim 4, wherein the selecting circuit allows one of the plurality of tracking circuits that tracked at the previous cycle one of the predetermined number of signals that was the best among the predetermined number of signals, to continue tracking at the present cycle the one of the predetermined number signals.

6. A receiver as set forth in claim 4, wherein when the past propagation conditions of the predetermined number of signals were similar to each other at the previous cycle, the selecting circuit allows one of the plurality of tracking circuits to continue tracking at the present cycle one of the predetermined number of signals based upon a power value of the predetermined number of signals.

7. A receiver for a spread spectrum communication system comprising:
    an acquiring unit that periodically acquires a plurality of signals received via a plurality of different paths from a transmitter; and a plurality of tracking units that track the plurality of signals acquired by the acquiring unit, respectively,
        wherein the acquiring unit allows one tracking unit to continue acquiring the signal that the tracking unit is tracking, and allows the other tracking units to commence tracking the signals that the acquiring unit newly acquires, upon judging there is no signal common to all the signals that the tracking units are tracking and all the signals that the acquiring unit newly acquires.

8. A receiver as set forth in claim 7,
    wherein the tracking units each include a first flag and a second flag, the first flag being used to indicate that the probability is large that the signal that the respective tracking unit is tracking is not a noise if the signal that the tracking unit is tracking coincides with a signal that the acquiring unit newly acquires, and the second flag being used to indicate that the signal that the tracking unit is tracking is not a signal that the acquiring unit has newly acquired if the signal that the tracking unit is tracking is not a signal that the acquiring unit newly acquires, and wherein when all the first flags each indicate that the probability is low, the acquiring unit allows a tracking unit whose second flag that indicates the signal that the respective tracking unit is tracking is not a signal that has been newly acquired to continue tracking the signal that the tracking unit is tracking.

9. A receiver as set forth in claim 8, wherein when a first plurality of second flags, among the plurality of second flags, indicate the signals that the respective tracking units are tracking are not signals that the acquiring unit has newly acquired, the acquiring unit allows the respective tracking units to continue tracking the signals they have been tracking.

10. A receiver as set forth in claim 9, wherein the acquiring unit judges whether to allow tracking continuation based upon the power of the signals that the tracking units are tracking.

11. A receiver as set forth in claim 8, wherein when all the second flags indicate that the signals that the tracking units are tracking are signals that the acquiring unit has newly acquired, the acquiring unit allows one tracking unit to continue tracking the signal that the respective tracking unit is tracking.

12. A receiver as set forth in claim 11, wherein the acquiring unit judges whether to allow tracking continuation based upon the power of the signals that the tracking units are tracking.

13. A synchronization acquiring apparatus comprising:

a plurality of synchronization tracking circuits;

a plurality of first flags, each corresponding to a respective one of said synchronization tracking circuits, each of the first flags being brought into a flag-off condition upon initiation of a synchronization acquiring operation and into a flag-on condition when a synchronizing position of a reception response agrees with a synchronizing position being tracked by the corresponding one of said synchronizing tracking circuits; and a plurality of second flags, each corresponding to a respective one of said synchronization tracing circuits, each of the second flags being brought into the flag-on condition when a synchronizing position is allocated to the corresponding one of said synchronization tracking circuits and into the flag off condition when the synchronizing position of the reception response agrees with the synchronizing position being tracked by the corresponding one of said synchronizing tracking circuits during a subsequent synchronization acquiring operation, each of the second flags being kept in the flag-off condition until the synchronizing position is allocated to the corresponding one of said synchronization tracking circuits.

14. A synchronization acquiring apparatus as set forth in claim 13, further comprising first allocation inhibit synchronization tracking circuit selecting means for selecting one of said synchronization tracking circuits specified by the second flags that are in the flag-off condition when the first flags are all in the flag-off condition, and for defining the selected synchronization tracking circuit as an allocation inhibit synchronization tracking circuit that continues to track synchronization.

15. A synchronization acquiring apparatus as set forth in claim 13, further comprising second allocation inhibit synchronization tracking circuit selecting means for selecting one of said synchronization tracking circuits specified by the second flags that are in the flag-on condition when the first flags are all in the flag-off condition, and for defining the selected synchronization tracking circuit as an allocation inhibit synchronization tracking circuit that continues to track synchronization.

16. A synchronization acquiring apparatus as set forth in 13, further comprising:

first allocating synchronization tracking circuit selecting means for selecting one of said synchronization tracking circuits that is at rest as an allocating synchronization tracking circuit which is to track a new synchronizing position, if at least one synchronization tracking circuit is at rest;

second allocating synchronization tracking circuit for selecting one of said synchronization tracking circuits that is operating and specified by having its first flag in the flag-off condition as an allocating synchronization tracking circuit, if at least one synchronization tracking circuit operating and has its first flag in the flag-on condition; and third allocating synchronization tracking circuit for selecting one of said synchronization tracking circuits that is operating and not the allocation inhibit synchronization tracking circuit as the allocating synchronization tracking circuit.

17. A synchronization acquiring apparatus as set forth in claim 13, further comprising third allocation inhibit synchronization tracking circuit selecting means for selecting from said synchronization tracking circuits specified by the second flags in the flag-off condition when the first flags are all in the flag-off condition, one showing the greatest tracked correlation power as the allocation inhibit synchronization tracking circuit that continues to track synchronization.

18. A synchronization acquiring apparatus as set forth in claim 13, further comprising fourth allocation inhibit synchronization tracking circuit selecting means for selecting, from said synchronization tracking circuits specified by the second flags in the flag-on condition when the first flags are all in the flag-off condition and the second flags are in the flag-on condition, one showing the greatest tracked correlation power as the allocation inhibit synchronization tracking circuit that continues to track synchronization.

19. A synchronization acquiring apparatus as set forth in claim 13, further comprising:

first allocating synchronization tracking circuit selecting means for selecting one of said synchronization tracking circuits that is at rest as an allocating synchronization tracking circuit which is to track a new synchronizing position, if at least one synchronization tracking circuit is at rest;

second allocating synchronization tracking circuit for selecting one of said synchronization tracking circuits that is operating and specified by having its first flag in the flag-off condition as an allocating synchronization tracking circuit, if at least one synchronization tracking circuit is operating and has its first flag in the flag-on condition; and a further allocating synchronization tracking circuit for selecting, from said synchronization tracking circuits that are operating and not defined as the allocation inhibit synchronization tracking circuit, the allocating synchronization tracking circuit one showing the smallest tracked correlation power as the allocating synchronization tracking circuit.

20. A receiver for a spread spectrum communication system provided with an acquiring circuit that cyclically acquires synchronization of a plurality of signals received via multiple paths from a transmitter, a spread code in the receiver, and a plurality of tracking circuits that track a given number of the plurality of signals acquired by the acquiring circuit for demodulation, the receiver comprising:

a judging circuit that judges whether propagation conditions of the given number of signals in a first cycle and in a second cycle of a plurality of cycles are higher than a given quality level or not, the second cycle following the first cycle; and a selecting circuit that, when the judging circuit judges a propagation condition of one of the given number of signals in at least one of the first cycle and the second cycle is not higher than the one signal that the tracking circuits should track in the first cycle, from the plurality of signals.

* * * * *